United States Patent [19]
Nakasa et al.

[11] Patent Number: 5,089,834
[45] Date of Patent: Feb. 18, 1992

[54] MOUNTING DEVICES FOR REMOVABLY MOUNTING AN ACCESSORY ON A CAMERA

[75] Inventors: Masayuki Nakasa; Norio Ishikawa; Hiroshi Hosomizu; Tatsuro Izumi; Keiji Yamazaki; Yukio Miki; Mamoru Katsuragi, all of Osaka, Japan

[73] Assignee: Minolta Camera Kabushiki Kaisha, Osaka, Japan

[21] Appl. No.: 625,786

[22] Filed: Dec. 10, 1990

Related U.S. Application Data

[63] Continuation of Ser. No. 351,177, May 12, 1989, abandoned.

[30] Foreign Application Priority Data

| May 16, 1988 | [JP] | Japan | 63-118623 |
| May 18, 1988 | [JP] | Japan | 63-122685 |
| May 18, 1988 | [JP] | Japan | 63-122686 |
| May 18, 1988 | [JP] | Japan | 63-122687 |
| May 18, 1988 | [JP] | Japan | 63-122688 |
| May 18, 1988 | [JP] | Japan | 63-122689 |

[51] Int. Cl.$^5$ .................................. G03B 17/05
[52] U.S. Cl. ...................................... 354/145.1
[58] Field of Search ............................. 354/145.1

[56] References Cited

U.S. PATENT DOCUMENTS

| 3,705,540 | 12/1972 | Reed et al. | 354/145.1 |
| 3,712,197 | 1/1973 | Wagner | 354/145.1 X |
| 4,249,813 | 2/1981 | Nihei | 354/145.1 X |
| 4,251,147 | 2/1981 | Sugimori et al. | 354/127 |
| 4,406,533 | 9/1983 | Yamamoto | 354/145.1 |

FOREIGN PATENT DOCUMENTS 56-42222 4/1981 Japan.

*Primary Examiner*—Brian W. Brown
*Attorney, Agent, or Firm*—Burns, Doane, Swecker & Mathis

[57] ABSTRACT

A mounting device on a camera has a mounting member to fit with an accessory so as to mount the accessory on the camera by sliding it. The mounting member which is molded out of plastic in one piece has eaves-like portions overhanging from an upper portion thereof in opposite directions intersecting perpendicularly to a mounting direction of the accessory, thus having a generally T-shaped cross section. The mounting member has a groove running in the mounting direction at a top central portion for receiving a projecting portion of the accessory so as to determine a horizontal (lateral) position of the accessory relative to the camera. The eaves-like portions receive mating members of the accessory thereunder so as to determine a vertical position of the accessory relative to the camera. The groove is narrower at the front end than at the back end where an insertion opening for the accessory mounting is provided, where the projecting portion of the accessory is similarly narrower at the front end from which the accessory is inserted into the groove.

58 Claims, 21 Drawing Sheets (TYPE 1)

(TYPE 2)

MOUNTING DEVICES FOR REMOVABLY MOUNTING AN ACCESSORY ON A CAMERA

This application is a continuation of application Ser. No. 351,177, filed May 12, 1989.

BACKGROUND OF THE INVENTION

1. Field of the Invention

This invention relates to a camera and camera accessory mounting mechanism which enables accessory devices to be mounted to and dismounted from a camera.

2. Prior Art

A typical conventional accessory shoe on the camera side and accessory foot on the accessory side used to mount accessory devices such as electronic flash devices to a camera are shown in the plane and cross section drawings of FIG. 24 (a) and (b), respectively. With this device, the electronic flash is mounted to the camera by inserting a foot 72, which is a mounting member on the electronic flash, in an accessory shoe 71, a mounting member of the camera. When the foot 72 is thus mounted in the accessory shoe 71, positioning on the right and left sides as seen in the figure (hereinafter referred to as horizontal (lateral) positioning) is accomplished by parallel sides 61 of the foot 72 and parallel inside faces 62 of the accessory shoe 71, and positioning in the up and down directions as seen in the figure (hereinafter referred to as vertical positioning) is accomplished by turning a nut 73 to press upper inside faces 63 of the accessory shoe 71 against faces 64 of the foot 72 together. At this time, front ends of the sides 61 and faces 64 of the foot 72 used for horizontal (lateral) and vertical positionings, respectively, are at the same position.

In recent cameras, single lens reflex cameras equipped with an autofocus mechanism (AF) have become predominant in the SLR market, and accessory electronic flash devices provided with an auxiliary light source function to enable accurate automatic focusing in dark situations have become common. However, the mounting devices used with these electronic flash devices are subject to gradual loosening and play, resulting in misalignment of the optical axes of the light beam emitted from the auxiliary light source and a taking lens of the camera, and thus limiting the effective range of the auxiliary light to the extreme. It therefore becomes necessary to increase the precision of mounting the electronic flash to the camera.

However, in the case of the conventional camera and accessory device mounting mechanism such as shown in FIGS. 24 (a) and (b), because horizontal (lateral) positioning is determined by the widest part of a fit surface of the foot 72, specifically by the sides 61 of the foot 72 and the inside faces 62 of the accessory shoe 71, when the accessory foot 72 is inserted into the accessory shoe 71, a large turning moment centering on contact portions of the sides 61 of the foot 72 and the inside faces 62 of the accessory shoe 71 occurs, and it is therefore possible for the foot 72 to be mounted on a bias causing the mounting of the accessory difficult. This can be prevented by providing sufficient space between the foot sides 61 and shoe's inside faces 62, but this would in turn increase the play in the lateral direction. Conversely, if the gap between the foot sides 61 and shoe's inside faces 62 is narrowed to control play in the horizontal (lateral) direction, the foot 72 will catch in the accessory shoe 71 and it will not be easy to mount and dismount the accessory device.

As also previously described, because the sides 61 of the foot 72 and the inside faces 62 of the accessory shoe 71 are parallel, the horizontal (lateral) positioning members of the accessory and camera mounting mechanisms overlap and fit together across the entire length of the sides 61 and the inside faces 62. Thus, the length of the fit surfaces of the accessory foot and accessory shoe when the accessory is mounted to the camera is long, and if the gap between the foot sides 61 and accessory inside faces 62 is narrowed to control play in the lateral direction, the foot 72 will bind or stick when the foot 72 is inserted to the accessory shoe 71 and easy mounting and dismounting will not be possible. In addition, even if the foot 72 does not bind, the friction generated during mounting and dismounting will be great and mounting and dismounting will be difficult.

Furthermore, because the width of the foot 72 at the front end in the direction of insertion (the distance between the sides 61) and the width of the insertion opening at the back of the accessory shoe 71 (the distance between the inside faces 62 of accessory shoe 71) are approximately equal, it is difficult to properly position the foot 72 to the insertion opening of the accessory shoe 71 when mounting the accessory.

Moreover, because the front ends of the sides 61 used for horizontal (lateral) positioning is at approximately the same position as the front of the faces 64 used for vertical positioning in the mounting mechanism of the flash device as described above, when the flash foot 72 is inserted to the accessory shoe 71, mating positions in both the horizontal (lateral) and vertical directions must be located at the same time, and it can therefore be difficult to mount the foot 72 to the accessory shoe 71 quickly.

Furthermore, some recent cameras have an accessory shoe like the one as shown in FIG. 24(a) which is provided with signal terminals 65, 66, 67 inside for sending and receiving signals between the electronic flash and camera so as to control the electronic flash.

However, because the conventional camera and accessory device mounting mechanism as described above regulates horizontal (lateral) positioning with the sides 61 of the foot 72 (i.e., the widest part of foot 72) and the inside faces 62 of the accessory shoe 71, and provides the signal terminals 65, 66, 67 between those inside faces 62, these signal terminals 65, 66, 67 are exposed on the top at a position where they can be touched relatively easily, and they are often touched accidentally by the operator. As a result, the surface of the signal terminals 65, 66, 67 corrode and poor contact easily occurs.

Furthermore, in cameras of the type which control the electronic flash with a control signal sent from the control circuitry in the camera, because the signal contacts connected directly to the control circuitry are similarly located in the wide area between the inside faces 62 of accessory shoe 71 where they are thus exposed to the outside, the electrical circuit elements of the camera may be adversely affected by static electricity.

Furthermore, in cameras which supply electrical power to the electronic flash and in the electronic flash devices which draw their power supply from such a camera, power supply contacts are also included in the signal contacts described above. In this case, too, it is similarly difficult to locate the power supply contacts in the accessory shoe in a position where they are not easily touched, and it is possible to accidentally touch both the accessory shoe and power supply contacts simultaneously and thus establish conductivity.

SUMMARY OF THE INVENTION

It is, therefore, an object of the present invention to provide a completely new type of mounting devices for cameras and accessories which provide high positioning precision.

It is another object of the present invention to provide a completely new type of mounting devices for cameras and accessories which enables easy mounting and dismounting.

It is still another object of the present invention to provide a completely new type of mounting devices for cameras and accessories which is able to prevent accidental touching by the fingers of the contacts, including signal contacts and electrical power contacts, used for electrical signal transmission between the electronic flash and camera.

In order to accomplish the above objects, in a mounting device for removably mounting an accessory on a camera which has a mounting member fixed to a camera and a mounting member fixed to an accessory, both of the mounting members fitting with each other, the mounting member of the accessory being slid on the mounting member of the camera so as to be set in place, the present invention is characterized by that the mounting member of the camera has first positioning means for determining a vertical position of the accessory relative to the camera and second positioning means located inside the first positioning means for determining a horizontal (lateral) position of the accessory relative to the camera; and that the mounting member of the accessory has first positioning means which fit with the first positioning means of the camera so as to determine the vertical position of the accessory and second positioning means which fit with the second positioning means of the camera so as to determine the horizontal (lateral) position of the accessory.

With the above construction, the following operation is obtained.

The mounting member of the accessory is inserted in the mounting member of the camera. At this time, the first positioning means of the camera and accessory fit with each other and determine the vertical position of the accessory relative to the camera. At the same time, the second positioning means of the camera and accessory fit with each other and determine the horizontal (lateral) position of the accessory relative to the camera. In determining the positions of the accessory relative to the camera, because the second positioning means are provided inside the first positioning means, positioning width for the horizontal (lateral) positioning is narrower, whereby high positioning precision is acquired especially in the lateral direction.

Furthermore, in the present invention, the widths of the first and second positioning means on the camera and accessory are narrower at the front with respect to a mounting direction than those at the back. Therefore, the mounting member of the accessory is readily inserted into the mounting member of the camera. In addition, the horizontal (lateral) and vertical positions are determined not by the entire length of the positioning means, but only by a very short distance at the front and back thereof. Accordingly, the mounting member of the accessory is smoothly slid in the mounting member of the camera, thereby making mounting and dismounting easier.

Furthermore, according to the present invention, guide means project forward of the second positioning means of the accessory, and also, in the front of the second positioning means of the camera are provided other guide means to receive the guide means of the accessory. In this case, at the beginning of a mounting process when the guide means of the accessory are inserted in a back portion of the second positioning means of the camera, the accessory is guided in the horizontal (lateral) direction, and then is guided in the vertical direction. This makes the alignment and insertion of the accessory into the mounting device of the camera extremely easy.

Furthermore, a groove running in a direction for mounting the accessory is provided at a top central portion of the mounting member of the camera and in the groove are provided a plurality of electric contacts for performing signal transmission between the camera and accessory. Preferably, the groove is narrow enough for one's fingers or thumb not to enter. Therefore, the contacts are not accidentally touched by the fingers.

Furthermore, the mounting member of the camera is provided with a concave portion. One or more electric contacts or terminals for supplying a large current from the camera to the accessory are positioned on a side surface or a lower surface of the concave portion so that the electric terminals are not touched by the fingers. Also, the mounting member of the accessory is provided with a convex portion to fit with the concave portion, and on a side surface or a lower surface of the concave portion is positioned one or more electric contacts to be connected to the large current electric contacts of the camera so that the contact are not accidentally touched by the fingers.

Preferably, the mounting member of the camera has eaves-like projections overhanging in opposite directions of the mounting member at a top portion thereof. gene Preferably, the mounting members of the accessory and camera are molded out of plastic in one piece, so that positioning members of the accessory and camera are well and tightly fitted with each other due to the elastic deformation property of the plastic, and the play between the positioning members can be minimized.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which.

DETAILED DESCRIPTION OF PREFERRED EMBODIMENTS

First, the outline of mounting devices as an embodiment of the present invention will be described.

Figure 1:
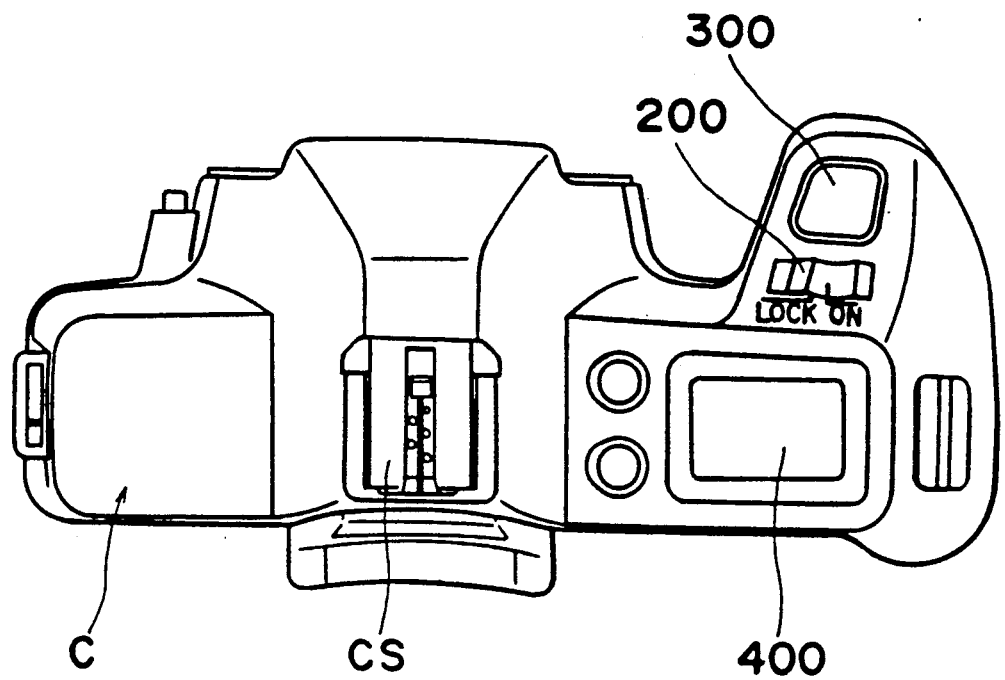
FIG. 1 is a top view of a camera provided with a mounting member according to a preferred embodiment of the present invention.

FIG. 1 is a top view of a camera according to a preferred embodiment of the present invention. As can be seen in FIG. 1, an accessory shoe CS for mounting a flash device is provided on the top of a camera body C, and the present invention is adopted to the accessory shoe CS. On the top of this camera are also provided a main switch 200, a shutter release button 300, a liquid crystal display (LCD) 400, and other members, but these are not directly related to the present invention and description of these is not provided herein.

Figure 4:
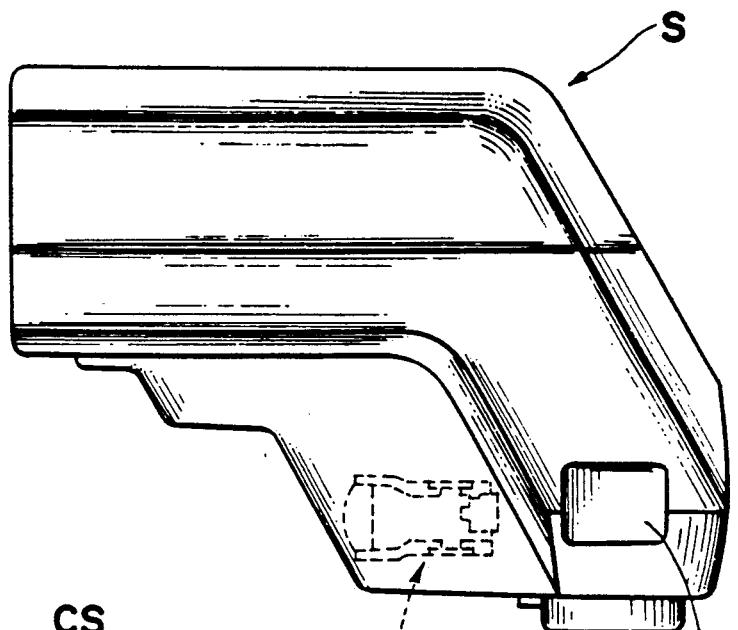
FIG. 4 is a side view of an electronic flash device provided with a mounting member according to the present invention.
Figure 3:
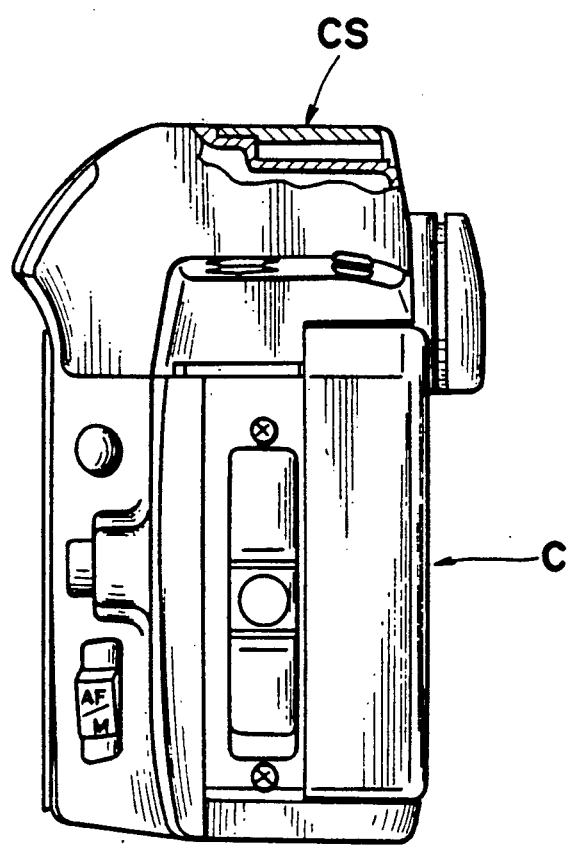
FIG. 3 is a side view of the camera body of FIG. 1.

FIG. 3 and 4 are side views of a camera body C and an electronic flash device S. The flash device S is mounted to the accessory shoe CS, which is a camera-side mounting member for the flash device S provided on the top of the camera body C, by means of its foot SF which is an accessory-side mounting member for the camera body C provided on the bottom of the flash device S, inserted to the accessory shoe CS by sliding a foot SF of the flash device S in, for example, from the back of the accessory shoe CS to the front. The flash device S is also provided with an auxiliary light projecting device AL which emits auxiliary light for automatic focus detection.

Figure 2:
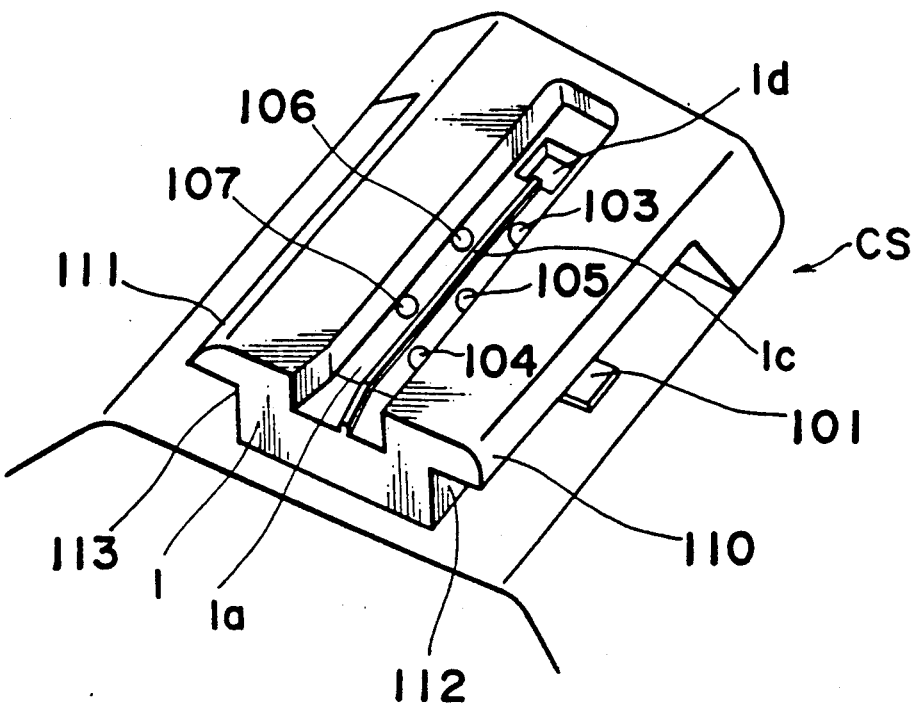
FIG. 2 is an enlarged perspective view of the mounting member of the camera shown in FIG. 1.

FIG. 2 is an enlarged perspective view of a main body 1 of the accessory shoe CS. The main body 1 of the accessory shoe CS is configured in such a manner that a mounting position of a flash device is controlled by guide rails 110, 111, which project from the relative opposite sides similarly to roof eaves, rail channels 112, 113, and a center channel 1a. Specifically, the foot SF of the flash device (hereafter, referred as flash foot SF) mounted in this accessory shoe is configured to fit precisely into the guide rails 110, 111 and the rail channels 112, 113, 1a, and is mounted by sliding the mounting member into the accessory shoe from an insertion opening. The inside of the center channel or indent 1a is provided with a recess 1d which functions to fit with a click lock member 21a provided on the flash device and shown in FIG. 6 in such a manner as to assure a firm contact. A group of electrical contacts 103, 105, 104, 106, 107 which are terminals for a camera circuitry is provided in two series and alternating in a staggered pattern on the center channel 1a.

The rail channels 112, 113 are provided in the center with electrical contacts or terminals 101, 102 for large current (the contact 102 is located symmetrically to the contact 101 but cannot be seen because FIG. 2 is a perspective view of the accessory shoe). These contacts and electric connections between the camera and flash device will be respectively described in detail later.

It is to be noted that the camera according to the present embodiment is accommodated to flash devices of two different types. Specifically, a first type of flash device is one which is not provided with an independent power source and receives its power supply from the camera, and a second type of flash device is one which is provided with an independent power source, does not receive its power supply from the camera, and functions by receiving only control signals from the camera. The flash device S of this embodiment is of the first type.

Now, the above accessory shoe CS and flash foot SF as mounting devices will be described in detail.

Figure 5:
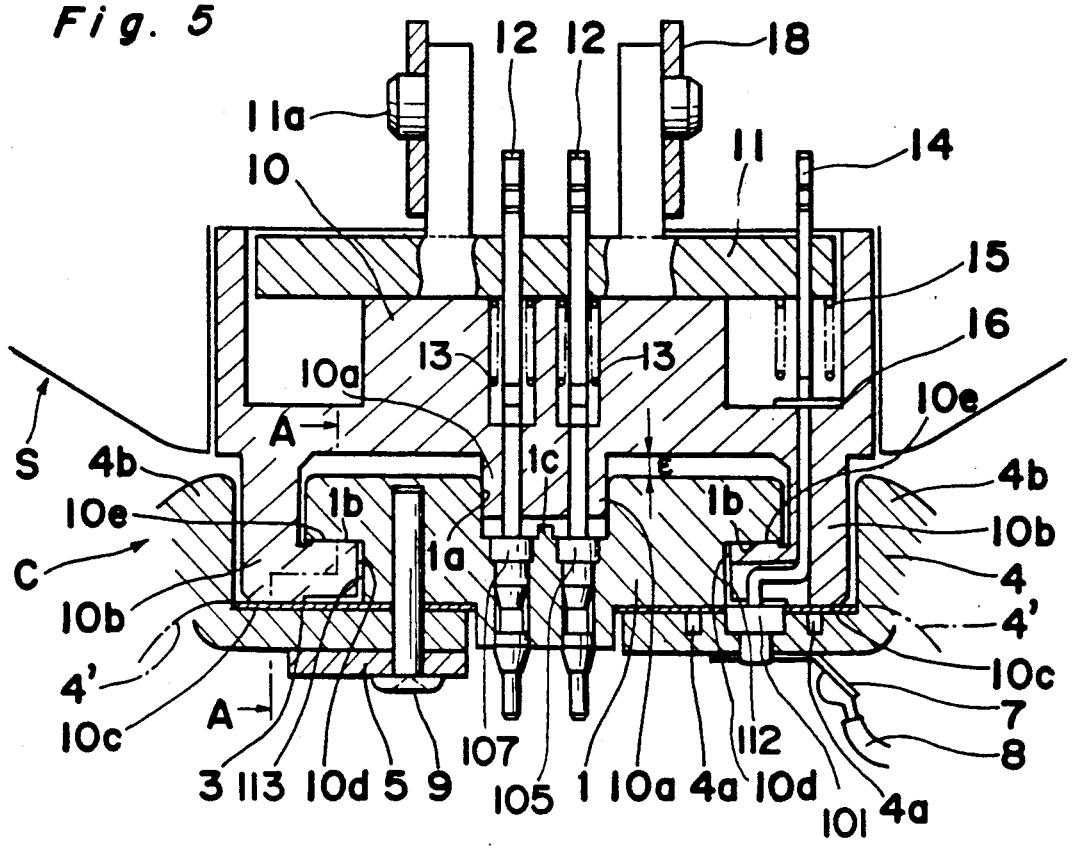
FIG. 5 and FIG. 6 are cross sections of the mounting members of the camera and flash device when the flash device is mounted to the camera body.
Figure 6:
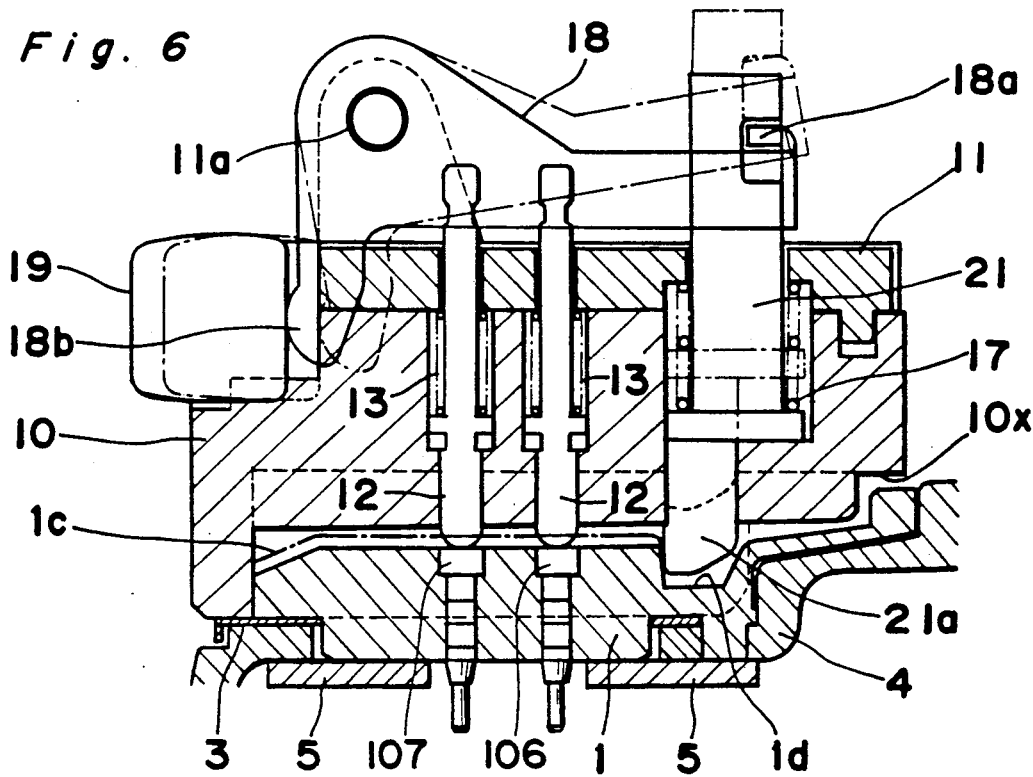
Figure 7:
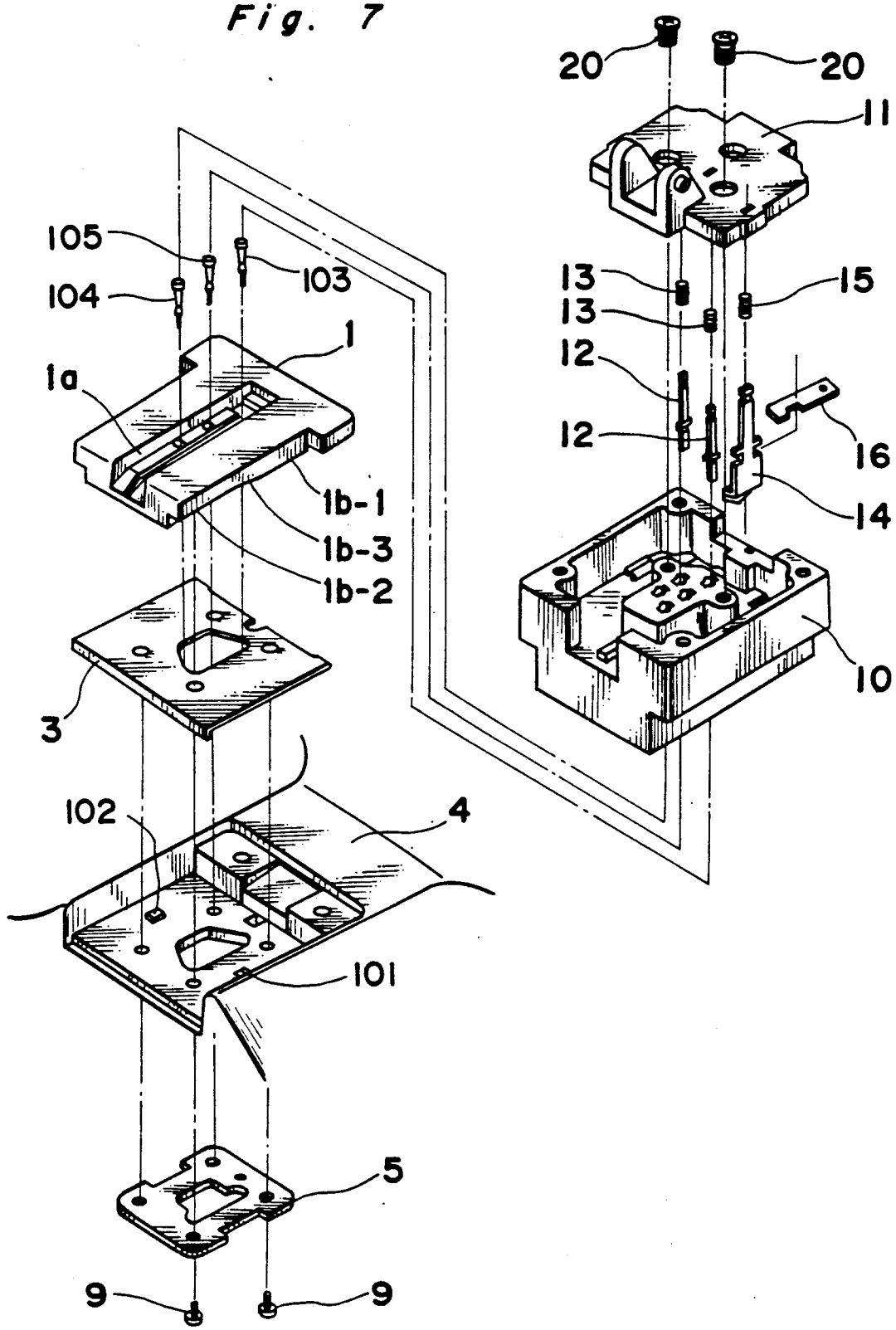
FIG. 7 is an exploded structural diagram of the mounting members of the camera and the flash device.

FIG. 5 is a cross sectional diagram, cut away in a direction perpendicular to the optical axis of the camera C, of the alignment of the flash foot SF and accessory shoe CS components when the flash device S is mounted to the camera body C. FIG. 6 is a cross sectional diagram, cut away in a direction parallel to the optical axis of the camera, of the alignment of the flash foot SF and accessory shoe CS components. Furthermore, FIG. 7 is an exploded structural diagram of the accessory shoe CS and the flash foot SF. The construction and alignment procedure of the components in the accessory shoe CS and flash foot SF will be described hereinbelow with reference to FIGS. 5, 6, and 7.

As shown in FIGS. 2 and 5 and as described above, the accessory shoe CS includes the main body 1 (hereinafter, referred as shoe 1) molded of plastic in one piece, the electrical terminals or contacts 103-107 (only a part of them is shown in the figures) for signal communications with the flash device S, the large current terminals 101 and 102 which are used as a large current supply terminal and a ground terminal for the large current, respectively, a sheathing member 4 which is a top cover of the camera, and a bottom plate 3 which is provided between the shoe 1 and the sheathing member 4.

On the other hand, the flash foot SF includes a main body 10 (hereafter referred to as foot body 10), movable contacts 12 which can slide vertically and are used for signal communications with camera body C, movable power supply terminals 14 which can similarly slide vertically, and a pressure plate 11 which functions as a guide for said movable contacts 12.

A detailed description of the accessory shoe CS is provided first. The shoe 1 has a generally T-shaped cross section with the guide rails 110 and 111 projecting to the sides in the manner of roof eaves (see FIG. 2), and mounted securely to the sheathing member 4 at the four corners by means of, for example, four screws 9 (only two of which are shown in the figure), through a reinforcing member 5 and the bottom plate 3 from the inside of the sheathing member 4.

The flash device S according to the present invention is compact because it is a flash device of the first type which does not have an integrated power supply and receives its power supply from the camera C. The two large current terminals 101 and 102 consisting of a hot line and a power ground respectively are provided in the sheathing member 4 at positions corresponding to the guide rails or eaves 110 and 111 of the shoe 1 such that when the flash device S is mounted to the camera body C, the large current terminals 101 and 102 and movable power supply terminals 14 are automatically connected. Therefore, the power supply means for the flash device can be integrated to the mounting members of the camera and the accessory, and it is not necessary to provide any other power supply means for the flash device. The large current terminals 101 and 102 are connected directly to the power supply of the camera body C because it is necessary to supply a large current to power the flash device S. Specifically, the large current terminals 101 and 102 are mounted and tightened to the sheathing member 4 and the bottom of each of the large current terminals 101 and 102 is connected to a solder lug member 7. The lug member 7 is then connected directly to a power supply terminal of the battery, not shown in the figure, built in to camera body C through a lead 8.

The large current terminals or contacts 101 and 102 are provided separated at the base of the shoe 1 on both sides under the eaves 110 and 111 as shown in FIGS. 2, 8 (a) and (b) in such a manner as not to be short-circuited by the hands or other conductive member. If the shoe 1, the bottom plate 3, and the sheathing member 4 are made of an insulation material such as plastic, the insulation of the electrical contacts 103–107 and the large current terminals 101 and 102 can be easily assured. Moreover, as shown in FIG. 5, channels 4a are provided around the large current terminals 101 and 102 to prevent current leakage caused by a film of water or sweat created by a capillary action.

In the present embodiment according to the present invention, the large current terminals 101 and 102 are provided inside convex portions 4b provided in the sheathing member 4, but as shown by a line 4', convex portions 4b can be eliminated and the large current terminals 101 and 102 can be purposely provided in an exposed manner. In such an embodiment, the large current terminals 101 and 102 are still protected by the eaves or guide rails 110 and 111 of the shoe 1, and there is no worry about accidental contact.

The location of the electrical terminals 103–107 is described hereinbelow with reference to FIGS. 8(a) and (b).

Figure 8A:
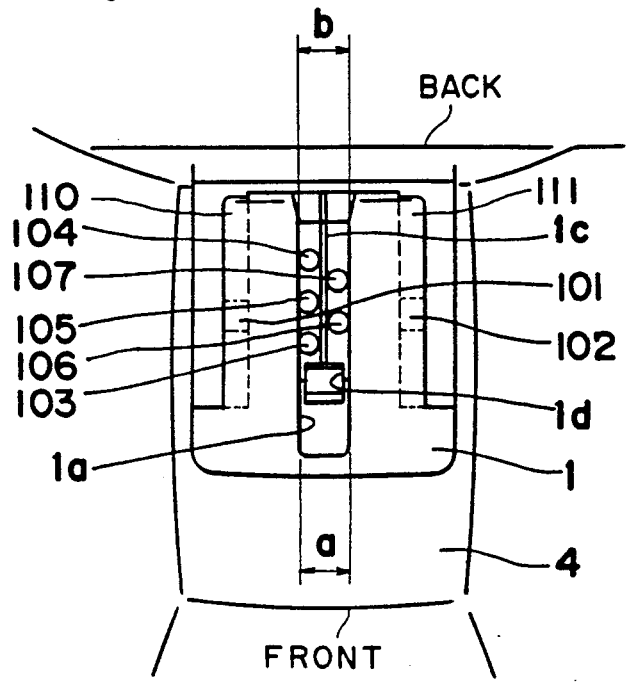
FIG. 8(a) is a schematic plan view of the mounting member on the camera body.
Figure 8B:
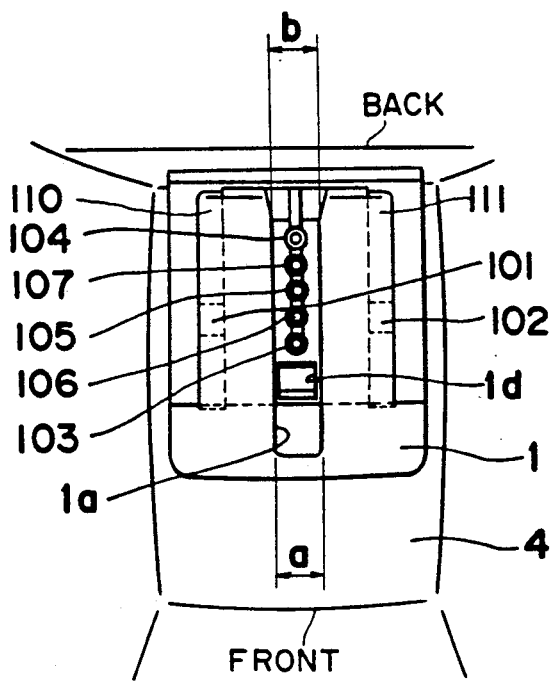
FIG. 8(b) is a schematic plan view of another embodiment of the mounting member on the camera body.

FIG. 8(a) shows the location of the electrical contacts in accordance to the above embodiment in which the electrical contacts 103–107 are provided in a staggered, two line array; FIG. 8(b) shows another example of the location in which the electrical terminals are arranged in a single line array. Between each of the electric contacts 103–107 arrayed in two series and alternating in a staggered pattern as shown in FIG. 8(a) is provided with a gap as large as possible. In addition, a separation band 1c is provided in the middle between the two series in such a manner as to isolate the series. The reason for such an arrangement and construction is to prevent short circuit of the electrical terminals 103–107 by water, sweat or dust, and thus improve reliability.

The electrical terminals 103–107 shown in FIG. 8 (a) and FIG. 8 (b) are provided inside the channel 1a provided in the center of the shoe 1 for determining a lateral position of the the flash device S. As shown in FIG. 2, the center channel 1a continues to the outside at the back of the shoe 1. By making the width of the center channel 1a small enough to prevent entry of a finger and by providing the electrical terminals 103–107 inside the center channel 1a, the electrical terminals 103–107 are protected from direct contact with the hand.

The transmission of signals between the camera body C and the flash device S of the first type is accomplished by means of the electrical terminals 103–107.

When the flash device S is mounted to the camera body C as will be described hereinafter, the recess 1d provided within the center channel 1a locks the flash device S in the camera body C. This recess 1d is formed in the center channel 1a to the front of the electrical terminals 103–107 so that when the flash device S is mounted to the camera body C, the movable contacts 12 on the flash device S do not drop within the recess 1d and be damaged.

The flash foot SF is next described in detail with reference to FIG. 5, FIG. 6, and FIG. 8 (c) which is a bottom view of the flash foot SF.

The foot body 10 includes foot members 10b which fit between the bottom plate 3 and bottom faces 1b of the guide rails 110 and 111 of the shoe 1. A vertical position of the flash device S is determined as will be described hereinafter by means of the bottom plate 3 and bottom faces 10c of the foot members 10b; and top faces 10e of the foot members 10b and the bottom faces 1b of the guide rails 110 and 111 of the shoe 1. At the bottom center of the foot body 10 is provided a convex portion 10a, which fits the center channel 1a provided on the top of the shoe 1 to determine the horizontal (lateral) positioning. Then, as will be described hereinafter, the horizontal (lateral) position is determined by respective both sides of the center channel 1a and the convex portion 10a.

The five movable contacts 12 are provided in an upright posture at the positions of the convex portion 10a corresponding to the positions of the electrical terminals 103–107. As shown in FIG. 7, these movable contacts 12 are normally forced down by springs 13, and as shown in FIG. 5, project downward from the face of the convex portion 10a. Thus, when the flash device S is mounted, the bottom surfaces of the movable contacts 12 slide across the electrical terminals 103–107, thus cleaning said contacts and assuring a positive contact and signal transmission between the electrical terminals 103–107 and movable contacts 12. The pressure plate 11, which is fixed by screws 20 to the foot body 10, holds the springs 13 and guides the movable contacts 12.

Moreover, in the flash device S which is powered by a power supply from the camera body C, the foot members 10b are provided with the movable power supply terminals 14 at the positions corresponding to the large current terminals 101 and 102 for supplying electricity to the battery of the flash device S. As with the movable contacts 12, these movable power supply terminals 14 are normally forced down by springs 15, which are fixed at the top portion by the pressure plate 11, and project downward from the foot members 10b as shown in FIG. 5. Thus, when the flash device S is mounted, the bottoms of the movable power supply terminals 14 slide across the tops of the large current terminals 101 and 102, thus performing a cleaning and assuring a positive contact and electrical transmission between the large current terminals 101 and 102 and movable power supply terminals 14. A stop plate 16 is a member to determine the lowest position of the movable power supply terminals 14.

The locking of the flash device S when the flash device S is mounted to camera body C is described next.

As shown in FIG. 6, a lock lever 21 locks the flash device S when the flash device S is mounted to the camera body C. This lock lever 21 is normally forced down by a lock spring 17. Then, when mounting of the flash device S is completed, the click lock member 21a provided on an end of the lock lever 21 is inserted to the recess 1d provided in the center channel 1a, and the flash device S is locked in position. At this time, because the click lock member 21a slides on the top of the separation band 1c, the electrical terminals 103-107 are not rubbed. In order to dismount the flash device S, a lock release button 19 is pressed. Thus an end 18b of a lock release lever 18 is pushed, and the lock release lever 18 pivots on an axis 11a. Then, the lock lever 21 mounted to the end of the lock release lever 18 by way of a hook 18a works against the force of the lock spring 17 and moves up, thus causing the click lock member 21a to separate from the recess 1d. Therefore, the flash device S can be slid and dismounted from the camera body C. In FIG. 6, the lock release button 19 is mounted at the back of the flash foot SF, but the lock release button 19 can be otherwise located at any position where it can be easily touched by the thumb, middle finger, or ring finger when the flash device S is dismounted, for example, located at the point indicated in FIG. 4 by SL to make the dismounting of the flash device S even easier.

The horizontal (lateral) and vertical positioning of the flash device S when mounted to the camera body C is next described.

Figure 8C:
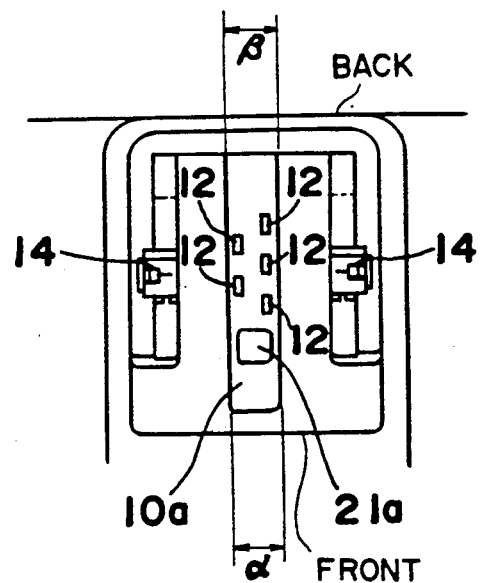
FIG. 8(c) is a bottom view of the flash device.

As previously described, the horizontal (lateral) position of the flash device S is determined by the sides of the center channel 1a of the accessory shoe CS and the convex portion 10a of the flash foot SF. As shown in FIGS. 8(a), 8(b) and 8(c), widths of the center channel 1a and convex portion 10a are narrower on the front side (lens mounting side) expressed by "a" and "α", respectively, than those on the back side expressed by "b" and "β", respectively; specifically, a<b and α<β, and each of the center channel 1c and the convex portion 10a tapers from front. Thus, the position is determined at the final stage of the mounting procedure. Therefore, on the way of mounting, lateral side inner faces of the center channel 1a and lateral side outer faces of the convex portion 10a are separated by a relative large gap, so that there is no necessity of considering the accuracy of the size of the gap for making easy the mounting. Therefore, the necessary length of a portion serving for determining the position is but a short distance (for example, only 1-2 mm). In other words, the horizontal (lateral) position is determined not by the entire length of the center channel 1a, but only by a very short distance at the front and back of the center channel 1a. Because the precise fitting of the center channel 1a and convex portion 10a is assured by a very short length as thus described, production is easier because the area in which high precision is required during manufacture is narrow. Furthermore, before the final stage of the mounting procedure, the gap is large, so that the flash device S does not catch or stick due to friction between the side of the center channel 1a and the side of the convex portion 10a during the mounting of the flash device S, thereby making mounting and dismounting easier, and producing a smoother, superior feel.

Moreover, because the width "α" at the front of the convex portion 10a is narrower than the width "b" at the back of the center channel 1a (the insertion opening for the convex portion 10a), alignment of the foot SF of the flash device S in the shoe 1 of the camera body C is easier when mounting the the flash device S, and insertion is likewise easier. Needless to say, the entire length of the side faces of the center channel 1a and the convex portion 10a is, preferably, manufactured with high precision, and also in that case, the mounting is easy since the determination of the position is achieved at the final stage of the mounting and, therefore, the gap between the side faces is large.

Figure 9:
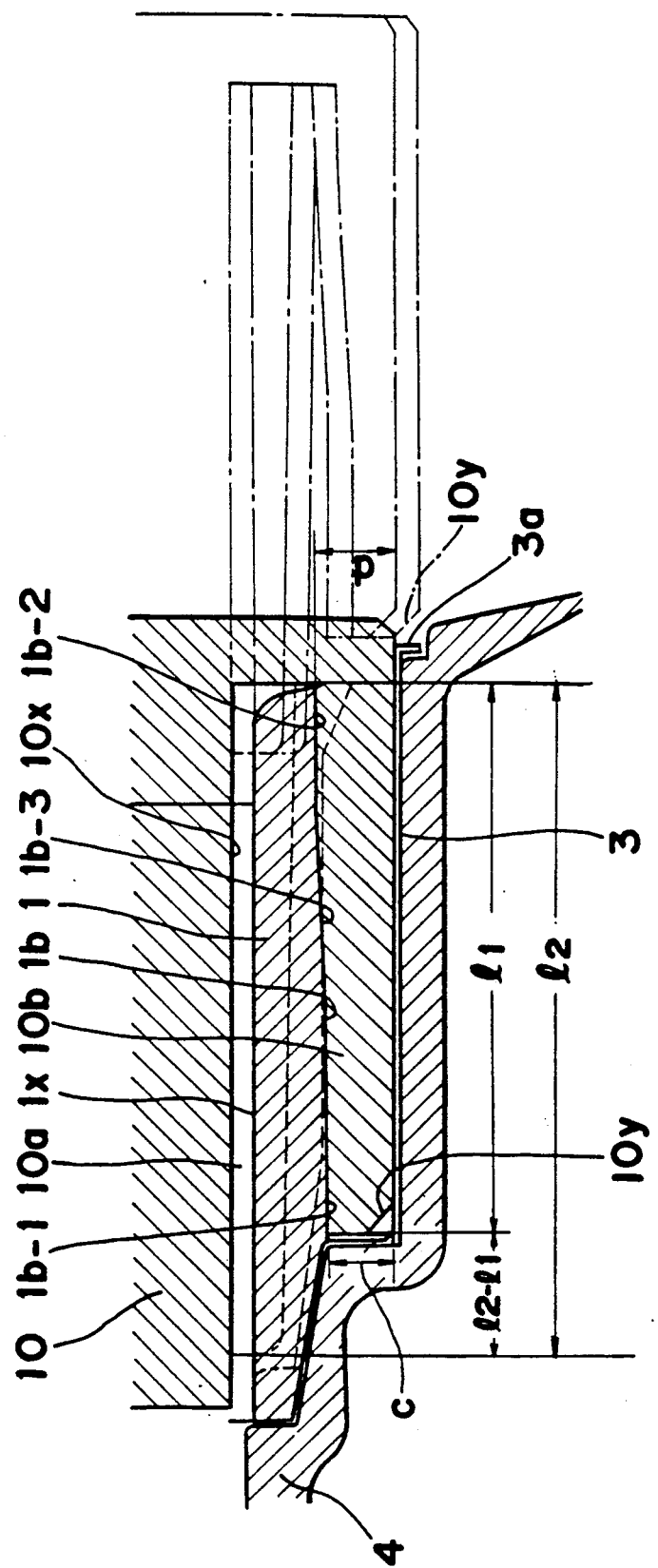
FIG. 9 is a cross section of line A—A in FIG. 5.

The vertical position is determined by the bottom faces 1b of the guide rails 110 and 111 of the shoe 1 and the top faces 10e of the foot members 10b. As shown in FIG. 7 and FIG. 9 (a cross section from line A—A in FIG. 5), the bottom faces 1b under the guide rails 110 and 111 are each comprised of a front portion 1b-1, a rear portion 1b-2, and an inclined middle portion 1b-3 between the front and rear portions. The foot members 10b, which are inserted between bottom faces 1b of the guide rails 110 and 111 and the bottom plate 3, are formed such that thickness c of a front portion (corresponding to the front portion 1b-1) is less than thickness d of a rear portion (corresponding to the rear portion 1b-2), specifically c<d. Insertion is therefore easy. Moreover, as with the horizontal (lateral) positioning of the foot of the flash device S as described above, the vertical position is determined by a very short distance at the front and back of the foot members 10b and the positioning is carried out at the final stage of the mounting procedure. Therefore, the foot members do not catch during mounting and dismounting, so that mounting and dismounting are easy and the tactile feel during mounting is excellent.

As shown in FIG. 9, the length l2 of the convex portion 10a used for the horizontal positioning is greater than the length l1 of the foot members 10b used for the vertical positioning (l2>l1). The foot of the flash device S is thus guided in the lateral direction of the camera during the mounting procedure by a part (length=l2−l1) projecting over the front side of the foot members 10b in the convex portion 10a and successively the foot members 10b enter between the guide rails 110 and 111 and the bottom plate 3, thus facilitating the flash device S mounting. At this time, a bottom face 10x of the foot body 10 first may contact a top face 1x of the shoe 1 (see FIG. 9). However, because a bottom front portion 10y of the foot body 10 is beveled, the foot members 10b ride up on an angled portion 3a of the bottom plate 3, and a gap is formed between the bottom face 10x of the foot body 10 and the top face 1x of the shoe 1. Therefore, the gap ε (see FIG. 5) can be maintained between the foot bottom face 10x and the shoe top face 1x, the shoe top face 1x is protected from scratches and damage, and the foot members 10b can be fit very smoothly.

The amount of play when mounting the flash device S to the camera body C is described next.

Figure 10:
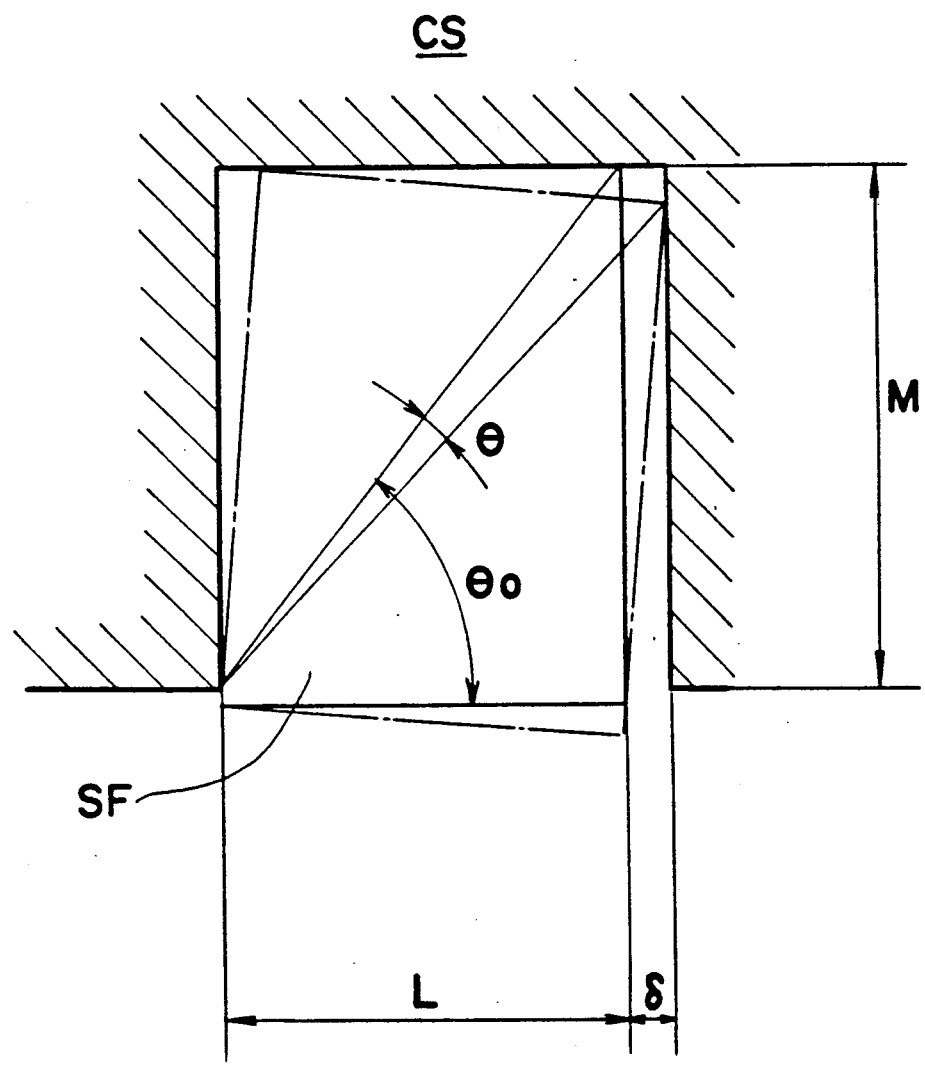
FIG. 10 is a descriptive diagram of the amount of play.
Figure 11A:
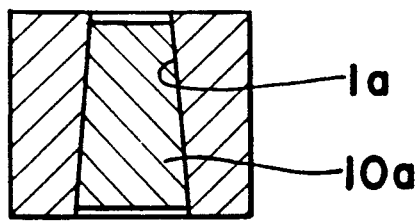
FIGS. 11(a)-(d) are diagrams showing alternative configurations of a center channel and a convex member.
Figure 11B:
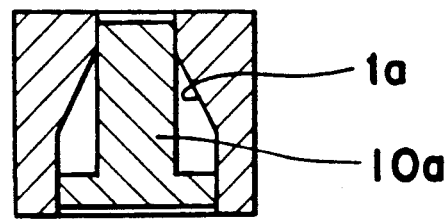
Figure 11B:
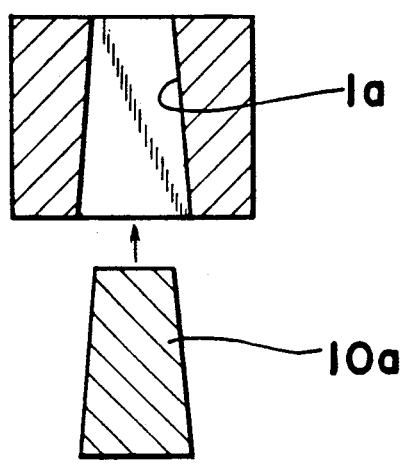
Figure 11B:
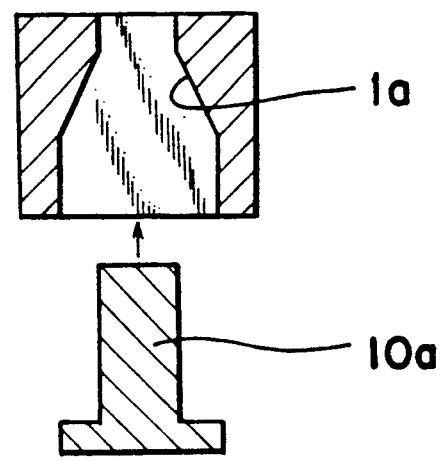
Figure 11C:
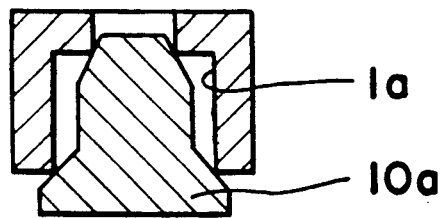
Figure 11D:
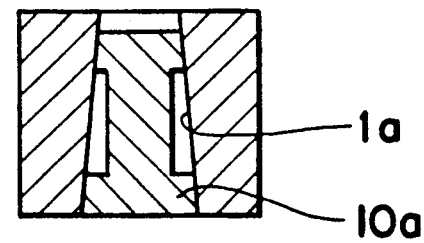
Figure 11D:
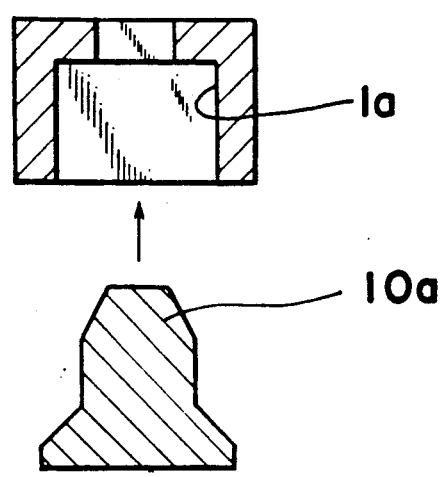
Figure 11D:
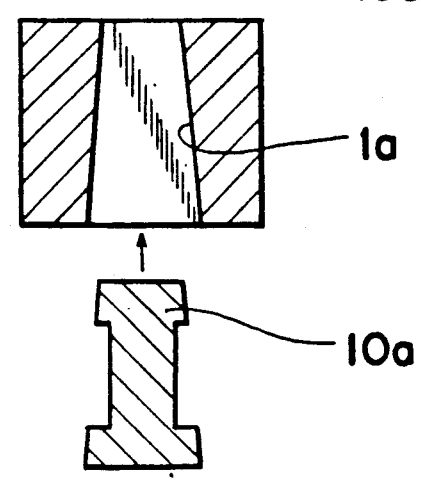

In FIG. 10, L represents the flash foot width, M and δ are respectively the length and gap for horizontal lateral) positioning. Play Θ (the amount of turning in the horizontal (lateral) direction) can therefore be expressed as follows.

$$\cos(\Theta_0 - \Theta) = \cos\Theta_0 + \delta/M \cdot \sin\Theta_0 = \qquad (A)$$

$$\sqrt{1 + (\delta/M)^2} \cdot \cos(\Theta_0 - \alpha)$$

wherein, $\tan \alpha = \delta/M$, $\alpha < \Theta$.

Thus, if δ min =0.2 mm, and M=18 mm, $$\delta/M = 0.011, \sqrt{1 + (\delta/M)^2} \approx 1,$$

and $\tan \Theta \approx \delta/M$. Therefore, play Θ decreases as the values of δ and M become respectively lower and higher, and is approximately determined by the value δ/M.

The affect of the flash foot width L is next considered.

Assuming that δ and M are constant and both members of the equation A are differentiated:

$$d\Theta/d\Theta_0 = 1 - \sqrt{1 + (\delta/M)^2} \cdot \sin(\Theta_0 - \alpha)/\sin(\Theta_0 - \Theta)$$

Thus, because $\alpha < \Theta$, $\sin (\Theta_0 - \alpha)/\sin (\Theta_0 - \Theta) > 1$, and therefore $d\Theta/d\Theta_0 < 0$, and the amount of play Θ decreases as $\Theta_0$ increases, specifically as the flash foot width L decreases.

Therefore, it is desirable that the horizontal (lateral) positioning length M be long and that the flash foot width L (specifically, the horizontal (lateral) positioning width) be narrow. Therefore, in the above preferred embodiment according to the present invention, with respect to the shoe 1 on the camera C, the center channel 1a, a horizontal (lateral) positioning member, is provided at the top center of the shoe 1 inside from the guide rails 110 and 111, vertical positioning members, the width (a or b) of the center channel 1a is as narrow as possible insofar as the reliability of the electrical terminals 103-107 can be assured (in the present embodiment this is approximately 4 mm), and the length of the center channel 1a is as long as possible (in the present embodiment this is approximately 10 mm) in order to minimize a lateral play and assure high positioning precision. Furthermore, by thus making the width of center channel 1a narrow, the electrical terminals 103-107 provided inside the center channel 1a are not touched by the fingers.

In addition, the width "a" of the front end of the center channel 1a is slightly narrower than the width "b" of the back end, and the thickness "c" of the front ends of the foot members 10b is slightly thinner than the thickness "d" of the back ends. The horizontal (lateral) position and vertical position of the flash device S are therefore determined at the last stage of the mounting procedure. Therefore, it is easier to insert the flash foot SF into the accessory shoe CS, and the mounting and dismounting is easier because there is no friction causing the flash device S to stick.

Additionally, the manufacturing cost can be decreased since only a small portion is required to be manufactured accurately in size. This is because the positioning is achieved by a very short section of the front and rear ends of the center channel 1a and of the foot members 10b.

Moreover, the length l2 of the convex portion 10a, which is used for the horizontal (lateral) positioning, is longer than the length l1 of the foot members 10b, which are used for the vertical positioning. Thus, when the flash device S is mounted to the camera body C, the flash device S is guided in the horizontal (lateral) direction at first by that portion which is of the convex portion 10a and extends beyond the foot members 10b, after which the foot members 10b are inserted between the bottom plate 3 and the guide rails 110 and 111 of the shoe 1, thereby making mounting of the flash device S easier.

In the preferred embodiment herein described, l2>l1, but it is also possible that l2<l1. In that case, at first the foot is guided in a vertical direction, and after that in a lateral direction.

Therefore, according to this embodiment, there is extremely little play in the flash device S when mounted even though it is not tightened by means of a nut or other means as used on conventional electronic flash devices, and it is possible to make the accessory shoe CS and the flash foot SF compact by reducing the cross sectional area of the the electrical terminals 103-107. Furthermore, if the shoe 1 and foot body 10 are manufactured out of plastic, the elastic deformation property of the plastic can be used to obtain a tighter fit between the foot members 10b and the inclined middle portion 1b-3 of the guide rails 110 and 111, thereby minimizing play in the vertical direction and achieving a greater cost reduction than would be possible with metal forming.

In this embodiment of the present invention, the electrical terminals 103-107 are provided inside the center channel 1a of the shoe 1. Thus, the electrical terminals 103-107 are not accidentally contacted by the fingers or other objects. Furthermore, because the movable contacts 12 are forced normally down by the pressure of the springs 13, the cleaning of the contact surfaces of the terminals 103-107 and the contacts 12 is carried out when the flash device S is mounted, so that a stable electrical contact can be assured even if the electrical terminals 103-107 and movable contacts 12 are rusted or corroded.

In the present embodiment of the invention, the large current terminals 101 and 102 and the two movable power supply terminals 14 are connected to each other under the guide rails 110 and 111 on both sides of and separated by the base of the shoe 1. Thus, the two large current terminals 101 and 102 are not short-circuited by the hands, water, or sweat. Furthermore, because the movable power supply terminals 14 are forced normally down by the pressure of the springs 15, a stable electrical contact can be assured by the cleaning effect when the flash device S is mounted even if the end surfaces of the large current terminals 101 and 102 and movable power supply terminals 14 are rusted or corroded. Furthermore, because the large current terminals 101 and 102 are automatically connected to the movable power supply terminals 14 when the flash device S is mounted to the camera body C, it is not necessary to provide a separate power supply means for the flash device.

In the present embodiment of the invention, the shoe 1 provided on the camera body C has a generally T-shaped cross section, but it is also possible to provide such a T-shaped cross section to the flash foot SF and construct the accessory shoe CS to conform to the configuration of the flash foot SF. However, an arrangement such as has been described with respect to the preferred embodiment of the present invention is desirable because it enables the accessory shoe to have a relatively simple shape and small size.

Furthermore, in the present embodiment of the invention, the horizontal (lateral) position is determined by both side faces of the center channel 1a and convex portion 10a, but the horizontal (lateral) position may also be determined by surfaces of the shoe 1 defining the sides of the rail channels 112 and 113 (see FIGS. 2 and 5) and sides 10d of the foot members 10b. However, in this case, the width for determining the horizontal (lateral) position will be greater than that of the present embodiment as described herein, and play will be relatively great.

Furthermore, in the present embodiment of the invention, the shapes of the center channel 1a and convex portion 10a which are used for horizontal (lateral) positioning of the flash device S are as shown in FIG. 11 (a), but configurations as shown in FIG. 11 (b), (c), and (d) may also be used. The configuration shown in FIG. 11 (b) provides a taper at the middle portion of the center channel 1a to make mounting of the flash foot SF to accessory shoe CS easier, and the configuration shown in FIG. 11 (c) provides a taper at the foremost and rearmost portions of the convex portion 10a to make mounting of the flash foot SF to accessory shoe CS easier, too.

Figure 12:
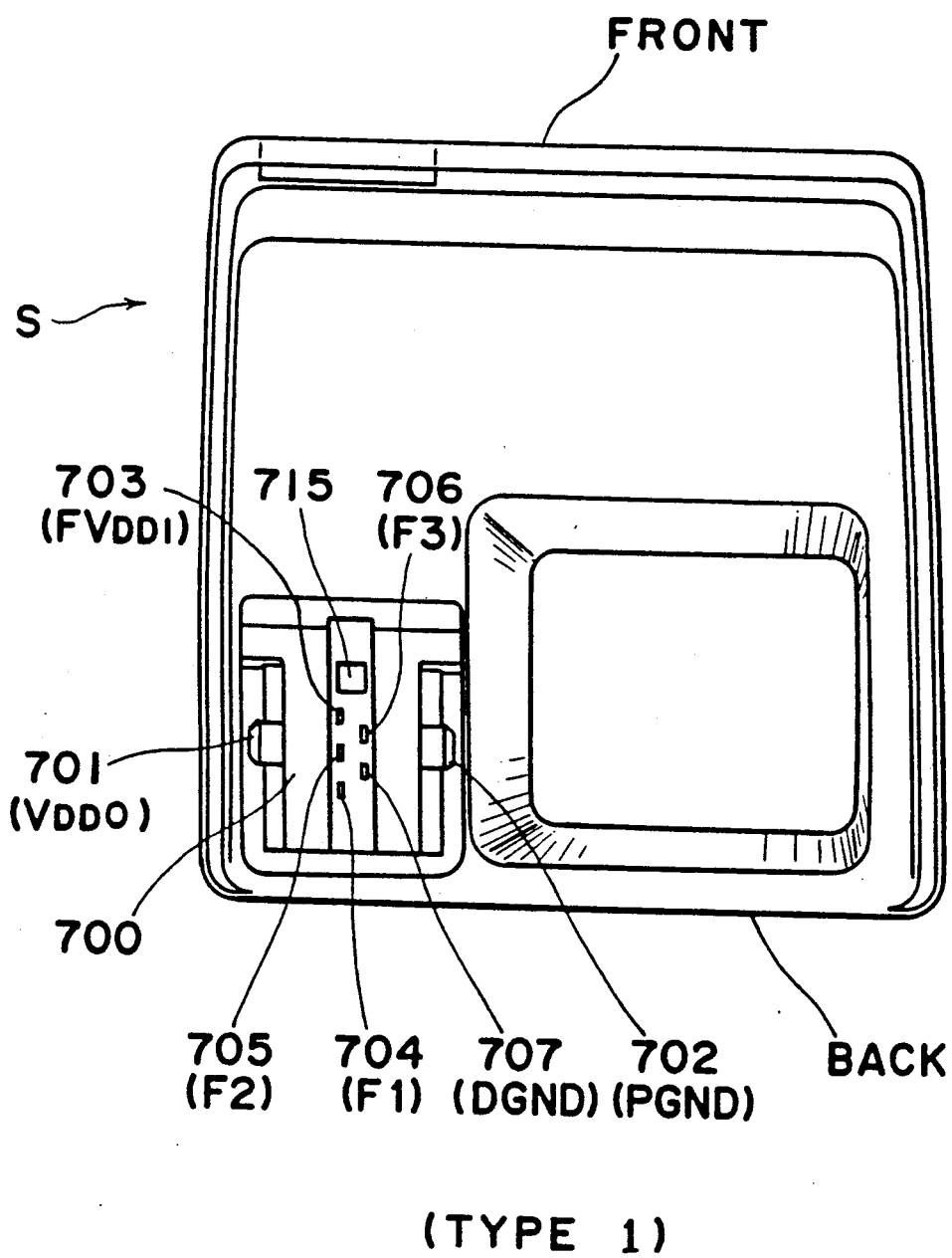
FIG. 12 and FIG. 13 are bottom views of different types of flash devices of the present invention mounted on said camera.

FIG. 12 is a bottom view of another embodiment of the electronic flash device of the first type. A mounting member 700 has a shape in which concave portions and convex portions are reversed as that of the accessory shoe CS of the camera such that it fits precisely with the accessory shoe CS. On both sides of the mounting member are provided large current contacts 701, 702, and in the center is provided a group of electrical contacts 703, 705, 704, 706, 707, which are terminals for a flash device circuitry, in two series and alternating in a staggered pattern such that these connect, respectively, with the electrical contacts 103, 105, 104, 106, 107 on the camera. 715 is a click lock member to fit in the recess 1d of the shoe 1.

Figure 13:
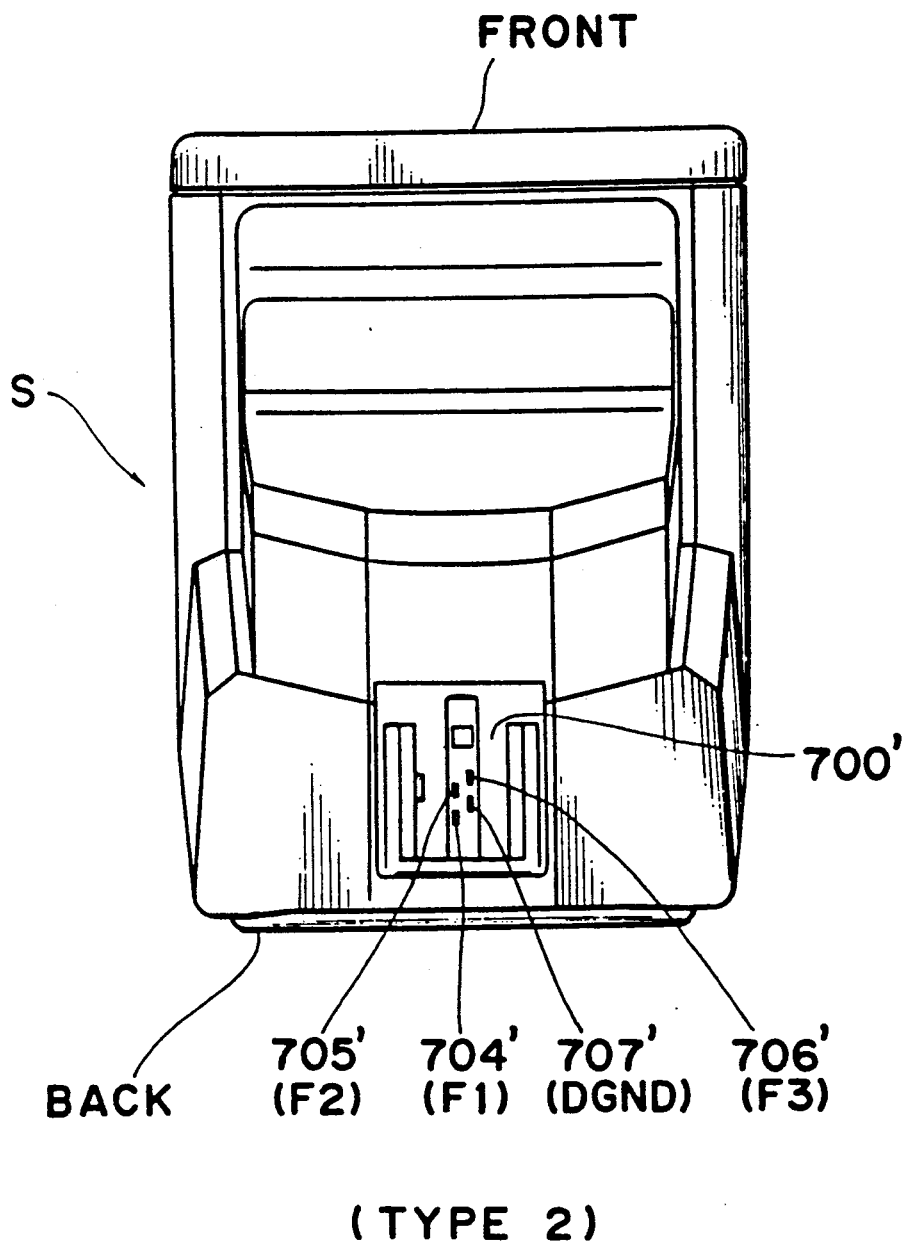

FIG. 13 is a view showing the bottom of the second type of flash device as described above. The shape of a mounting member 700' is exactly identical to that of the first type of flash device, but electrical contacts differ. The reason for this will be described later, but it should be noted that contacts corresponding to the large current contacts 701, 702 and the contact 703 are not provided in this construction.

The electric circuitry and circuit connections in the mounting devices of the present invention will now be described in detail with respect to the flash devices of the first and second types shown in FIG. 12 and 13.

Figure 14:
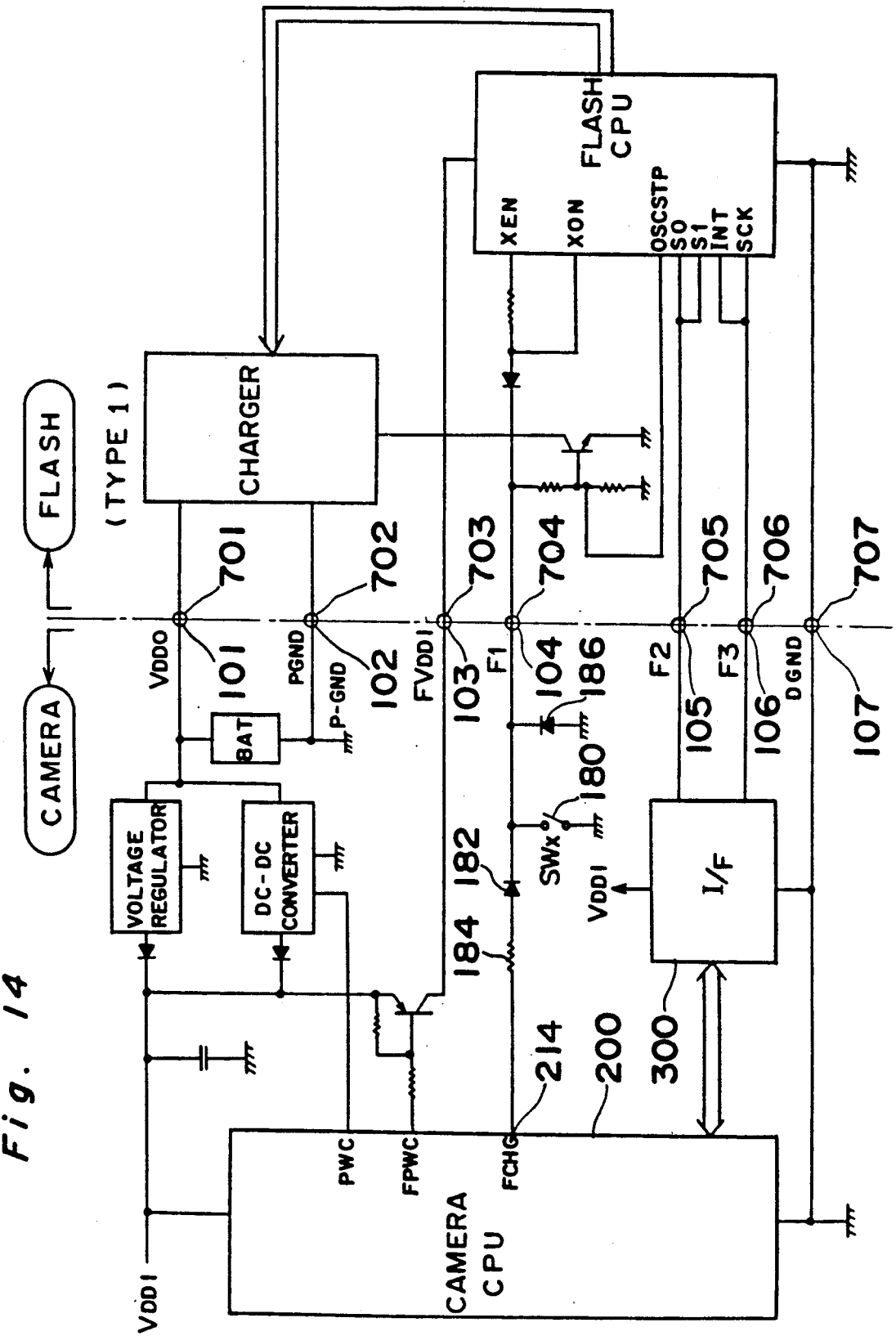
FIG. 14 and FIG. 15 are circuit diagrams showing the circuit connections between the camera and flash devices of FIG. 12 and FIG. 13, respectively.

FIG. 14 is a circuit connection diagram in which the first type of flash device of FIG. 12 is properly connected to the camera.

In FIG. 14, VDD0 (101, 701) and PGND (102, 702) are terminals for supplying large current from the camera C to the flash device S and ground terminals for the large current. Because it is important that the contact resistance be as low as possible, the contact configuration differs from that of the normal signal transmission contact groups 103–107 (703–707). Specifically, as shown in FIG. 2 and FIG. 12, the large current and the ground contacts 101 (701) and 102 (702) have large contact areas when compared with the contacts 103–107 (703–707) and provided inside the rail channels 112, 113. FVDD1 (103, 703) is a contact which supplies an electric power for a logic circuit of the flash device from the camera to the flash device.

X-contact terminals F1 (104, 704) are for outputting and inputting a signal for triggering a flash light emission from the camera to the flash device S; if these terminals become LOW when a main capacitor in the flash is in a fully charged state, the flash emits a flash light. Specifically, when the shutter is released and a first curtain of a focal plane shutter has traveled completely, continuity exists to the X contact (SWX 180 in FIGS. 14 and 15), the synchronization signal is sent from the camera C to the flash device S via F1 (104, 704), and the flash device S emits light synchronously.

It is to be noted that when a flash of the first type is mounted, a signal which controls a boosting charging of a main capacitor in the flash device is also sent from the camera to the flash device via this contact when not in the shutter release sequence.

Furthermore, in FIG. 14, 182 and 186 are diodes having a resistance against high voltage, and 184 is a resistor for the protection of a camera CPU 200. Commonly available flash devices are of various types, including devices in which a high voltage charge of several hundred volts is directly applied to the X-contact terminals, and ones in which a reverse voltage of several hundred volts is applied to the X-contact terminals. As a safety measure against the direct application of a high voltage charge, a diode 182 and a resistor 184 are provided to prevent a high voltage from being applied directly to a terminal 214 of the CPU 200 in the camera, and as a safety measure against the application of a reverse voltage, a diode 186 is provided to bypass the current. In the case of a reverse voltage being applied, the potential of F1 (104) becomes negative in an amount equivalent to the forward current of the diode 186, but because the diode 182 is also present, the negative potential is not applied to the terminal 214 of the CPU 200 in the camera.

F2 (105, 705) and F3 (106, 706) are terminals for serial data transmission between the camera and flash, and specifically F2 (105, 705) is for serial data and F3 (106, 706) is for serial clocks.

DGND (107, 707) is a ground terminal for signal transmission.

Figure 15:
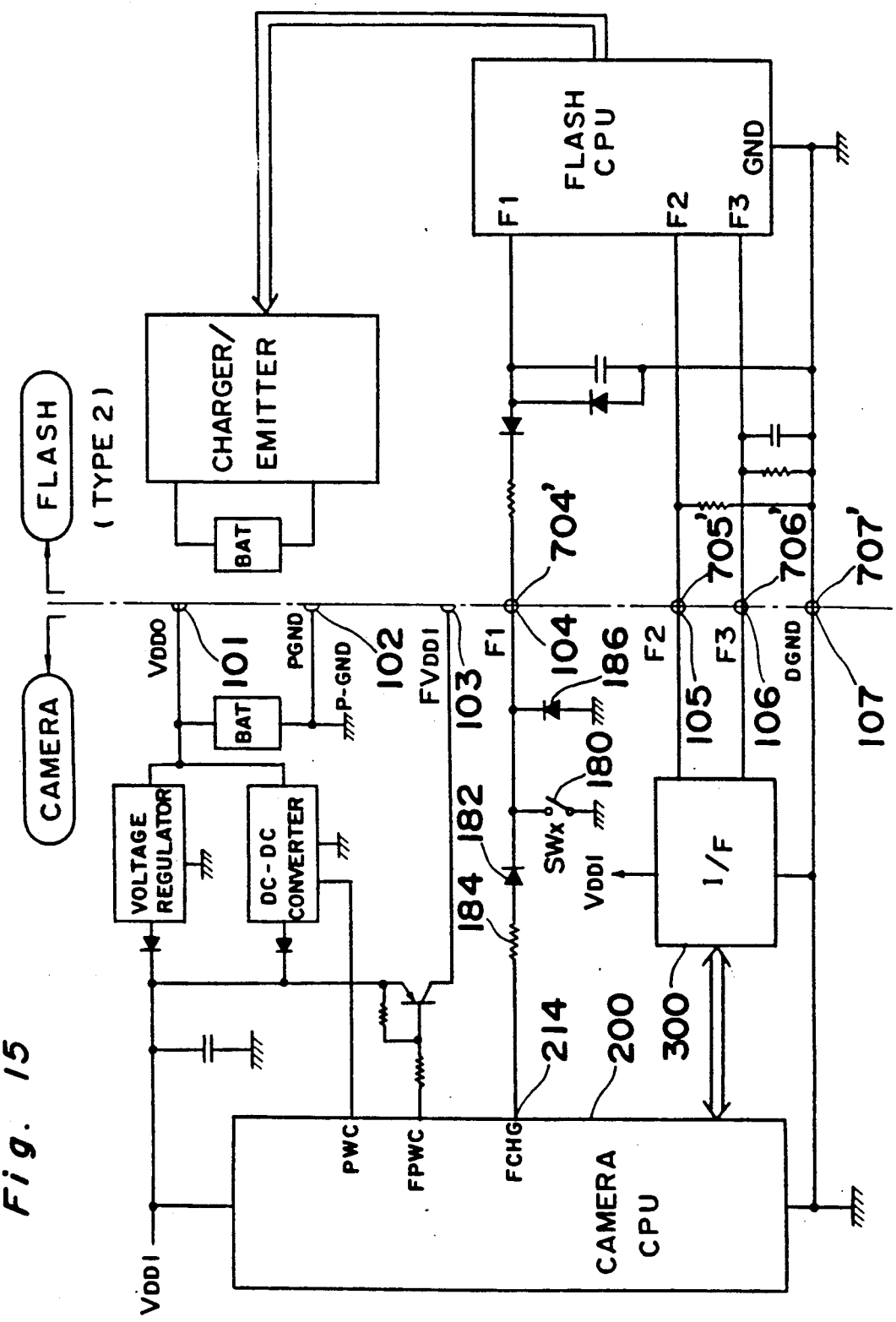

FIG. 15 is a circuit connection diagram in which the second type of flash device is properly connected to the camera.

A flash of the second type is provided with its own power supply, and does not need to receive a power supply from the camera. Therefore, terminals VDD0, PGND, and FVDD1 are not provided, and only terminals or contacts F1 (704'), F2 (705'), F3 (706'), and DGND (707') are provided in the flash.

The functions of F1, F2, and F3 are the same as those for the first type of flash as described above.

As described with reference to FIG. 2 above, the flash device S is mounted by facing the front of the flash device toward the lens side (i.e., the front side) of the camera and sliding the mounting member or foot of the flash device into the accessory shoe CS from the back of the camera. The flash device S is dismounted by sliding the flash device to the back and off the accessory shoe CS in the direction opposite that of mounting the flash. Therefore, if the contacts are aligned parallel to the direction of flash device mounting and dismounting, the contacts on the flash device and on the camera will be temporarily in an improperly connected state during the flash mounting and dismounting process.

If the camera circuitry and the flash circuitry are improperly connected, the camera circuitry and/or the flash circuitry may function improperly and in extreme cases the circuitry of either device may be impaired. Furthermore, it may also happen that the circuitry misoperates during flash mounting or dismounting, causing the flash to emit light and thus surprising the photographer.

If the contacts are arrayed in a single series as shown in FIG. 8(b), improper circuit connections will frequently occur during the flash mounting and dismounting process (in the example shown there are three possible improper connections). This creates extremely complex problems with respect to the construction of the interface circuit between the camera and flash device, therefore makes the circuit construction required to cope with the resultant problems complex, and thus increases costs. If the contact group is arrayed in a row perpendicular to the direction of flash mounting (insertion) (i.e., the lateral direction of the camera), improper circuit connections will not occur during the flash mounting and dismounting process, but it is extremely difficult to obtain on the confined space on the camera a space large enough to array the contacts in a row in the above direction.

From these various reasons, the contacts in the preferred embodiments according to the present invention 10 are, as shown in FIGS. 2, 7, 8(a) and (c), 12, and 13, arrayed in two series in a staggered pattern in a confined space to minimize improper circuit connections occurring during the flash mounting and dismounting process. It is to be noted that the case shown in FIG. 8(b) does offer disadvantages such as previously described when compared with the case of FIG. 2, but it is clear that the technology of the present invention can be applied to that case shown in FIG. 8(b), and the case may be considered an alternative embodiment according to the present invention. This embodiment offers the advantage of requiring less space in the lateral direction when compared with that shown in FIG. 2.

The relationship of the circuit connections during the flash mounting and dismounting process for the embodiment as shown in FIGS. 2, 12, etc. in which the terminals F1 (104), DGND (107), F2 (105), F3 (106), and FVDD1 (103) are arrayed in a staggered pattern in order from back to front of the camera is described below.

A combination of the camera with a flash of the first type is first considered.

Figure 16:
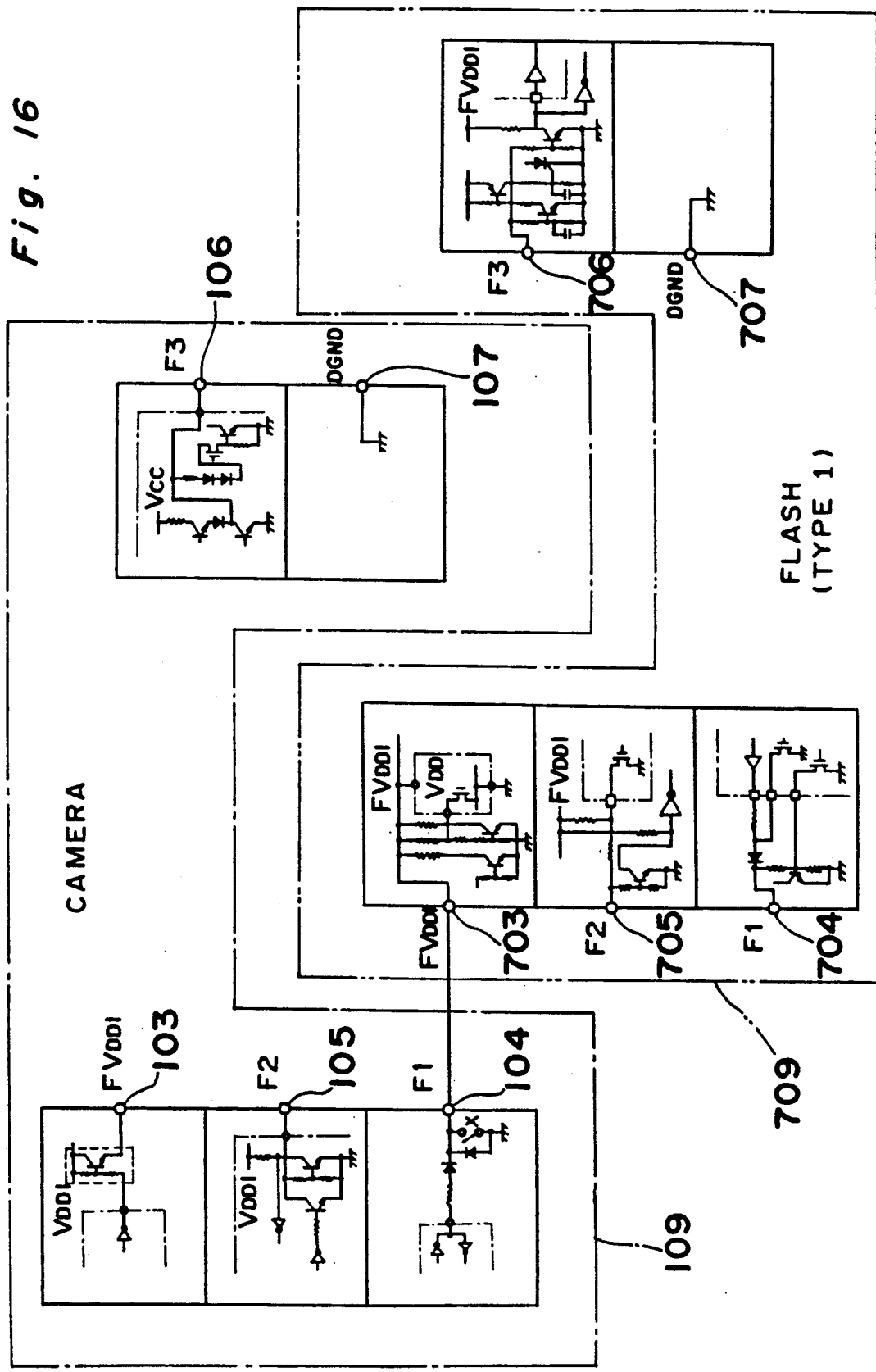
FIGS. 16, 17, 18, 19, 21, and 23 show the improper circuit connections occurring during mounting of a flash device to the camera.
Figure 17:
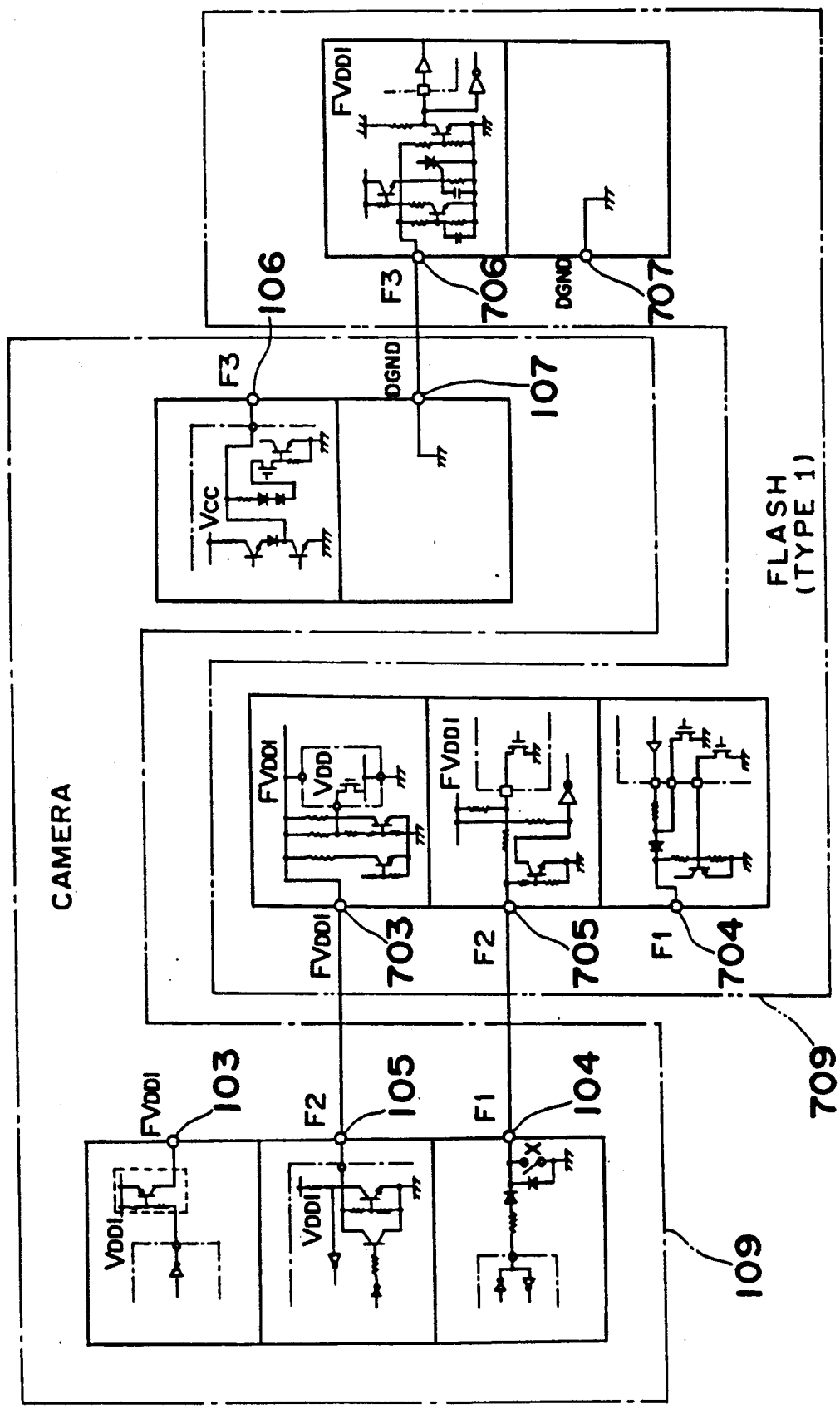

FIG. 16 and FIG. 17 show transitional connections occurring during the mounting process of a flash device of the first type to the camera.

In FIG. 16 and FIG. 17, the area 109 circumscribed by a single dot-dash line represents the camera contacts or terminals and interface circuits connected to the contacts, and the area 709 circumscribed by a double dot-dash line represents the flash device contacts or terminals (of the first type) and interface circuits connected to contacts.

At the first stage of the mounting process as shown in FIG. 16, only the terminal F1 (104) on the camera and terminal FVDD1 (703) on the flash connect, and the other contacts are not connected. Therefore, because a closed circuit is not formed in this state, this connection is electrically insignificant, and there is no problem.

Next, as mounting proceeds to the stage as shown in FIG. 17, terminals F2 (105), F1 (104), and DGND (107) on the camera are respectively connected to terminals FVDD1 (703), F2 (705), and F3 (706) on the flash device. In this state, a power supply for signalling is not supplied through a normal path in a signal processing circuit of the camera. The terminal F2 (105) on the camera also does not have the ability to supply a current since the circuit connected to the terminal F2 inside the camera is a type of open-collector. The terminal F1 (104) on the camera is a bi-directional CMOS circuit that normally has a LOW output and does not supply a power current. Therefore, in a connection as shown in FIG. 17, because there is no power supplied from the camera to the flash device, there is no concern about improper operation.

The combination with a flash of the second type is described next.

Figure 18:
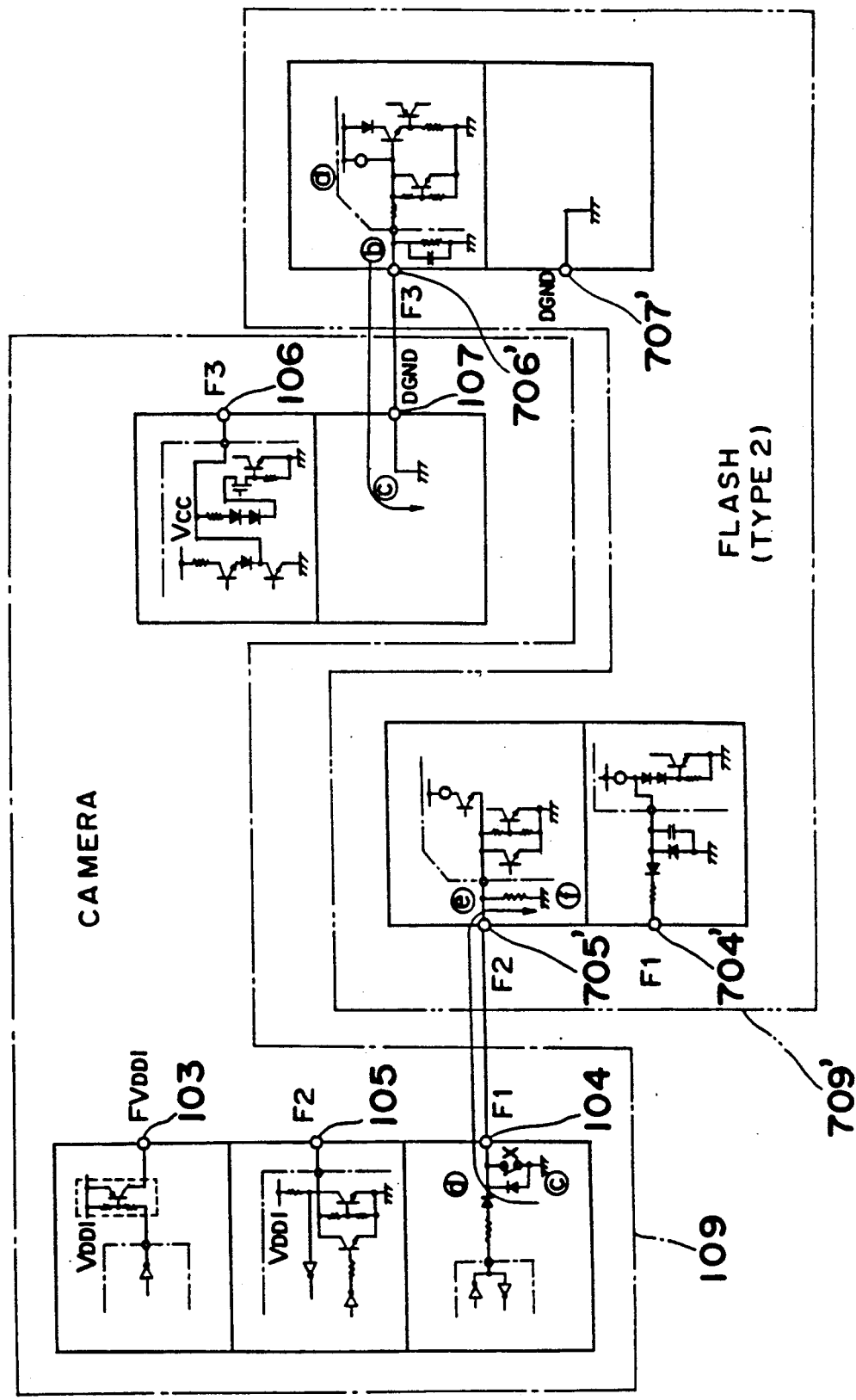

FIG. 18 shows the transitional connections occurring during the mounting process of a flash device of the second type to the camera.

In FIG. 18, the area 109 circumscribed by a single dot-dash line represents the camera contacts and interface circuits connected to said contacts as in FIG. 17, and the area 709' circumscribed by a double dot-dash line represents the flash device contacts (of the second type flash) and interface circuits connected to said contacts.

At the first stage of the mounting process as shown in FIG. 18, the terminal F2 (705') on the flash connects with the terminal F1 (104) on the camera, and F3 (706') on the flash connects with DGND (107) on the camera. (Because there is no terminal FVDD1 on the flash, this stage of the mounting process corresponds to the second stage of the mounting process with the flash device of the first type.)

At this time, because the flash device has its own power supply, current flows from (a) to (b) to (c) to (d) to (e) to (f) as shown in FIG. 18, through resistors, transistors, and diodes. This is not a normal current path, but it will not damage the circuit or cause any improper operation.

This is described below in more detail.

Figure 19:
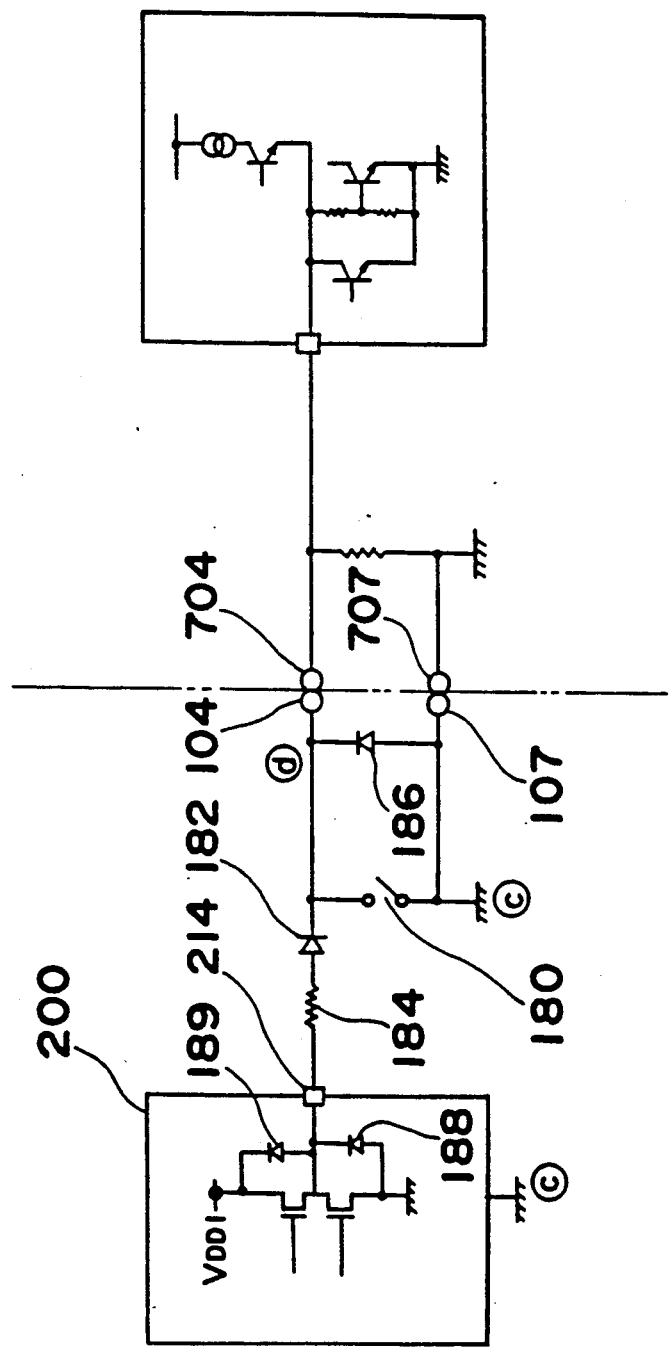

FIG. 19 is a detailed drawing of the circuit corresponding to section (c)-(d) in this current path. The output circuit for the output terminal 214 of the camera CPU 200 is a CMOS construction to which parasitic diodes 188, 189 are provided. Therefore, in the event a reverse bias is applied to the terminal F1 (104), the current paths of (c)-(d) include one passing diode 186 and one passing parasitic diode 188 in the CPU 200; because the latter has a resistor 184 and a diode 182 provided in series, nearly all currents will in practice pass the diode 186, and there is, therefore, virtually no stress applied to the CPU 200.

Figure 25:
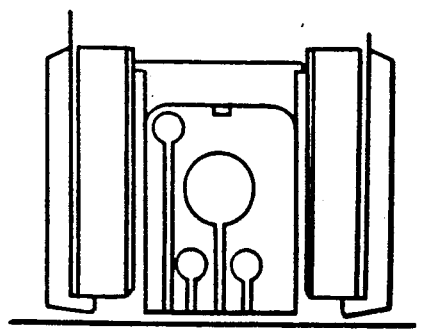
FIG. 25 shows another conventional mounting member of a camera.

However, because the diode 186 requires performance with respect to voltage resistance and current capacity as a means of providing protection against high reverse voltage application, greater mounting space is required and costs increase. In the present invention, by changing the configuration of the accessory shoe from the conventional design shown in FIG. 25 to the configuration shown in FIG. 2, conventional flash devices of the type to which a reverse voltage is applied are not directly mounted to this camera, and for this reason, it is not always necessary that the diode 186 be provided within the camera. Therefore, it is possible that the diode 186 be removed from the camera circuitry. It is to be noted that if an adapter which converts the accessory shoe configuration as shown in FIG. 2 to the accessory shoe configuration as shown in FIG. 25 is provided, it will be possible to mount a conventional flash corresponding to the accessory shoe as shown in FIG. 25 to the camera of the embodiment, and in this case the diode 186 may be provided within the adapter.

In the event the diode 186 is removed from the camera circuitry for the above reasons, the current from (c) to (d) passes through the parasitic diode 188 in the CPU 200. In this case, a stress equivalent to the forward voltage to the parasitic diode 188 will be applied to the terminal 214 in the CPU 200, but because the reverse voltage occurring at F1 (104) of the camera is low, and because the resistor 184 and the diode 182 are in series with the parasitic diode 188, the aforementioned stress is extremely small, and is of a level which presents no problems with respect to the CPU 200 hardware.

In the second stage of the flash mounting process, a normal circuit is formed because the flash device is completely mounted.

As hereinbefore described, in the preferred embodiments according to the present invention, improper circuit operation, accidental flash light emission, and circuit damage do not occur during the flash mounting process.

In the case in which the flash device is dismounted, equivalent phenomena occur because the process is the exact reverse of the mounting process, and further description is herein omitted.

The description given hereinabove has related specifically to a case in which the terminals F1 (104), DGND (107), F2 (105), F3 (106), and FVDD1 (103) are arrayed in a staggered pattern in the above order from rear to front of the camera. Specifically, the above array was obtained from the following points of view:

1. Accidental flash light emission is avoided when mounting the flash by an array in which the X-contact of the flash is connected last.

2. Improper operation of flash device logic circuits is avoided by an array in which the voltage output terminal of the camera is connected last.

3. Signal contacts which do not output a voltage from the camera may be arrayed in such a manner that said contacts may momentarily connect improperly during the mounting process.

A case in which the contact array differs from that described above and trouble occurs is described below.

Figure 20:
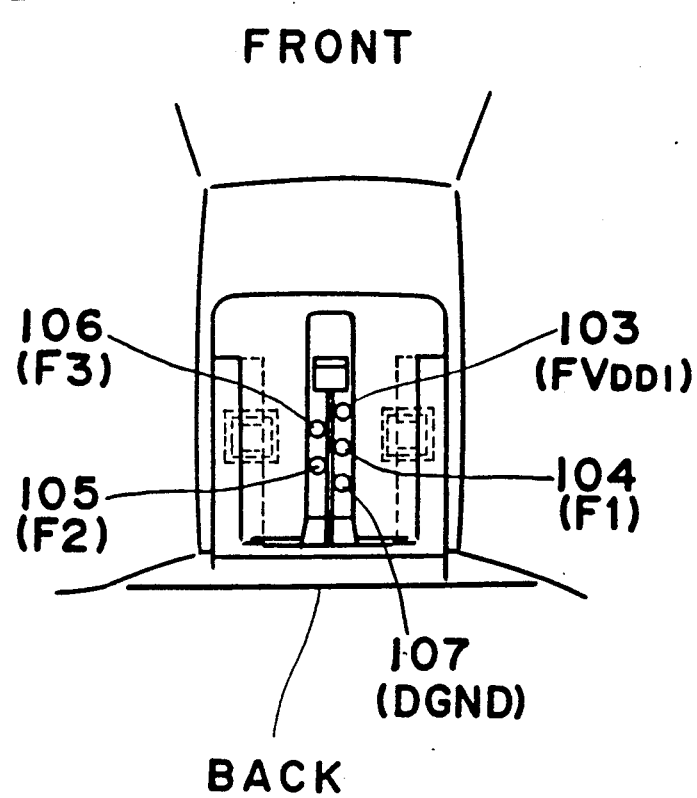
FIG. 20 and FIG. 22 show contact arrays used for a comparison of the contact arrays according to the present invention.
Figure 21:
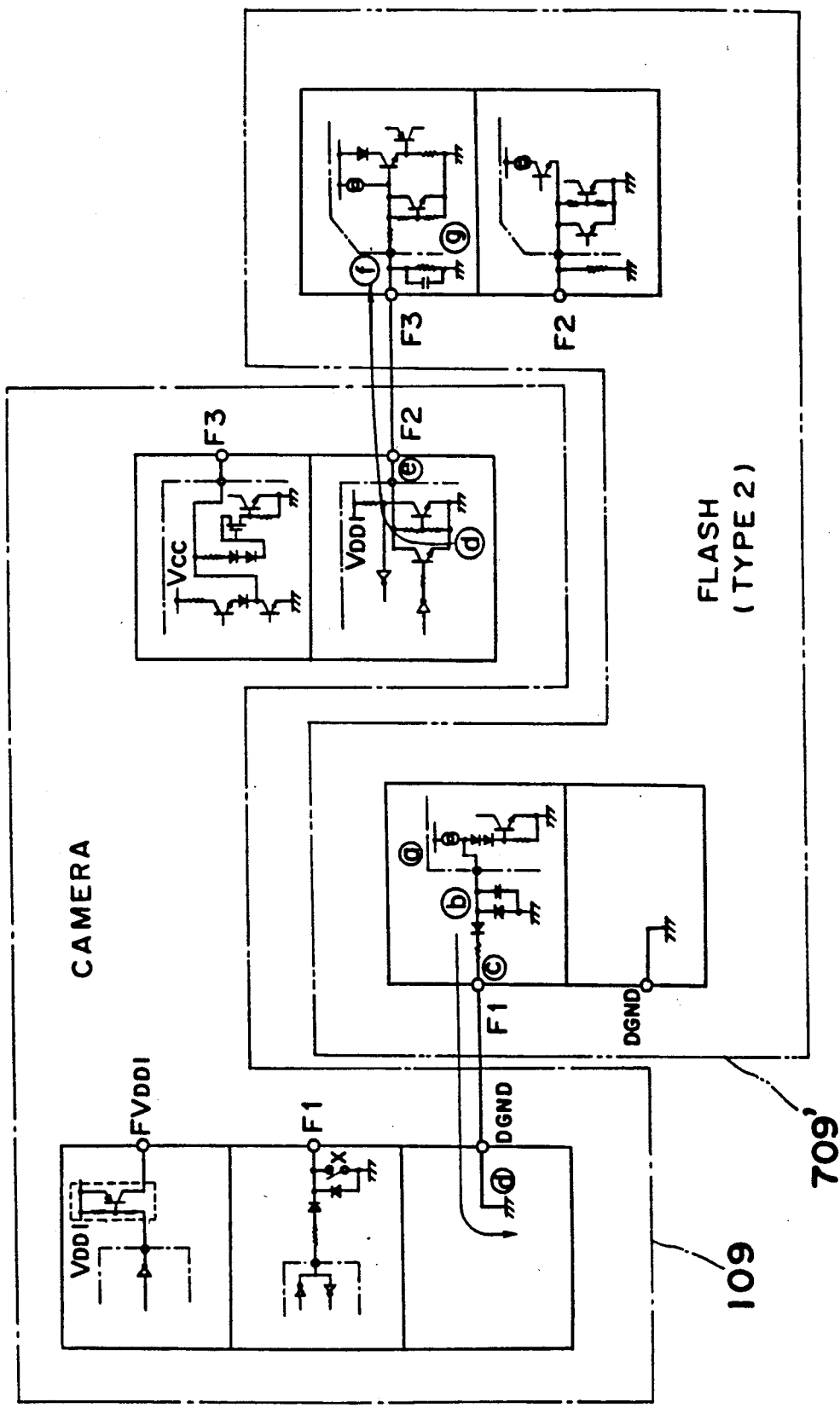

In this case, terminal (contacts) DGND (107), F2 (105), F1 (104), F3 (106), and FVDD1 (103) are arrayed in a staggered pattern in the above order from back to front of the camera as shown in FIG. 20. In this case, trouble occurs when the camera is combined with a flash of the second type. Specifically, at the first stage of the mounting process as shown in FIG. 21, the terminals F1 and F3 of the flash connect momentarily with the terminals DGND and F2 of the camera, respectively. Because the flash has a self-contained power supply, current flows from (a) to (b) to (c) to (d) to (e) to (f) to (g), and as a result, the terminal F1 of the flash (that is, the X contact) is connected through the camera circuitry to the GND contact of the flash with a certain impedance. Thus, if the flash device is mounted (or dismounted) with (or from) the circuitry including the main capacitor in the flash in a fully charged state, the flash device may accidentally emit flash light at some point in the mounting or dismounting process.

Moreover, because the current flows from (d) to (e), the potential at (e) in the camera circuitry becomes lower than the potential of (d), and if the camera circuitry consists of an IC, it is possible that the absolute maximum rating of the IC will be exceeded and the IC be destroyed.

For these reasons, the contact array as shown in FIG. 20 presents many problems and is therefore not desirable.

A case in which the contact array differs further from the above, specifically, in which the power supply contact (FVDD1) of the camera connects improperly when mounting the flash device, is described below.

Figure 22:
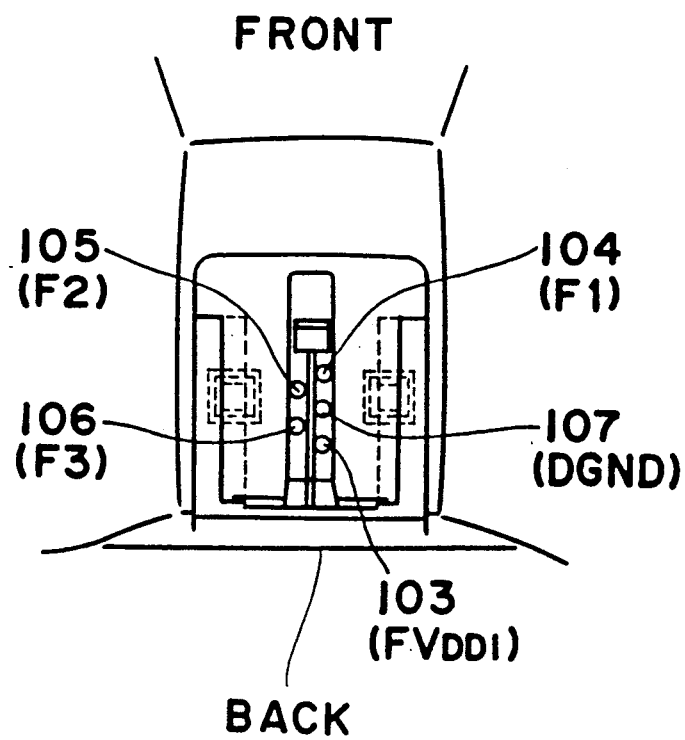
Figure 23:
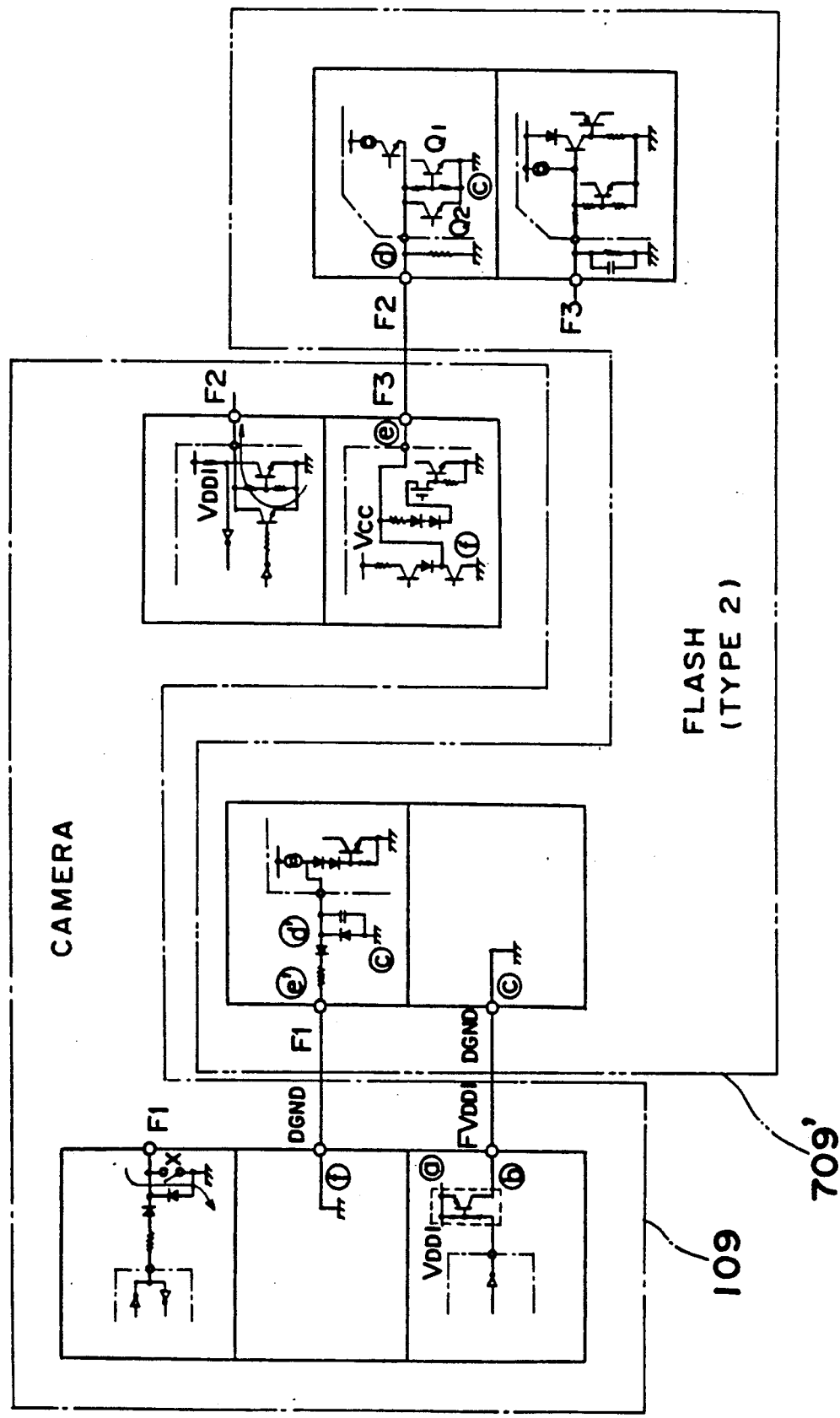
Figure 24A:
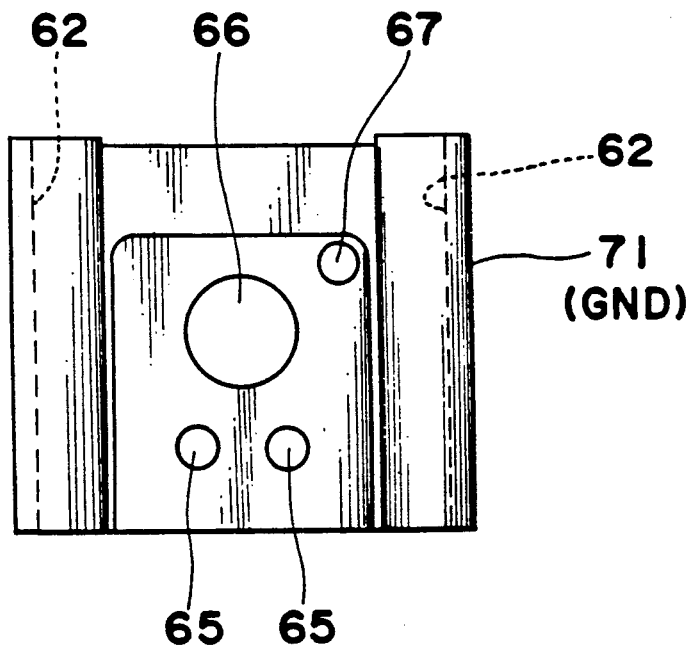
FIG. 24(a) is a plan view of a conventional mounting member of a camera.
Figure 24B:
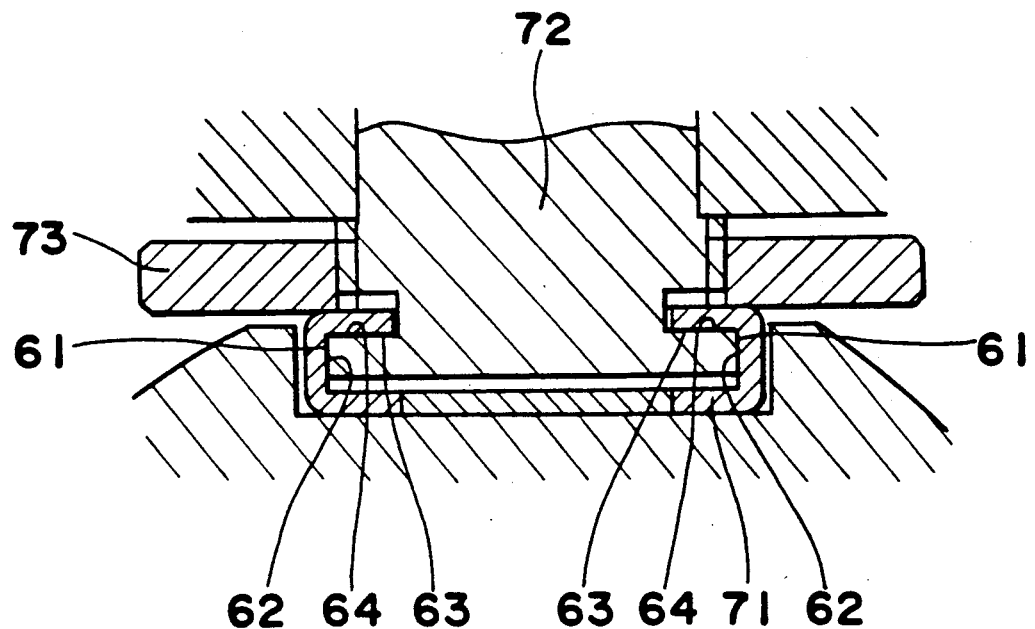
FIG. 24(b) is a cross section of the conventional mounting members of the camera and flash device when the flash device is on the camera.

As shown in FIG. 22, terminals (contacts) FVDD1 (103), F3 (106), DGND (107), F2 (105), and F1 (104) are arrayed in a staggered pattern in the order from back to front of the camera. In this case also, trouble occurs when the camera is combined with a flash of the second type. Specifically, at the first stage of the flash mounting process as shown in FIG. 23, the terminals F1, DGND, and F2 of the flash connect momentarily with the terminals DGND, FVDD1, and F3 of the camera, respectively. At this time, current flows from (a) to (b) to (c) to (d) to (e) to (f). Therefore, a reverse bias is applied to the circuitry in the flash, for example to transistors Q1, Q2, and it is possible that the circuitry in the flash may be destroyed.

Current may also flow from (a) to (b) to (c) to (d') to (e') to (f), thus causing the F1 contact on the flash to be pulled to a negative potential from the flash side, and causing the flash to accidentally emit light. In this example, a reverse bias is applied to the flash circuitry because the power supply contact FVDD1 of the camera is positioned such that it improperly connects momentarily during the flash mounting process, and because the F1 contact on the flash is positioned such that it improperly connects momentarily during the flash mounting process, problems such as the flash accidentally emitting when being mounted occur.

The examples described with reference to FIGS. 20 to 23 are specific examples in which problems will occur, and if the basic principles of the contact array according to the present invention are deviated from with other contact arrays, improper operation and circuit damage may occur.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A mounting device of a camera for removably mounting an accessory on the camera, comprising a mounting member which fits with an accessory which is slidable onto the mounting member, wherein said mounting member includes first positioning means for determining a vertical position of the accessory relative to the camera; and second positioning means located inside said first positioning means for determining a horizontal position of the accessory relative to the camera, wherein said mounting member is fixed to the camera, and is provided with eaves-like portions which overhang from an upper portion thereof in relative opposite directions which perpendicularly intersect a mounting direction of the accessory, thus having a generally T-shaped cross section, said second positioning means being located in a top face of said eaves-like portions.

2. A mounting device of a camera for removably mounting an accessory on the camera, comprising a mounting member which fits with an accessory which is slidable onto the mounting member, wherein said mounting member includes first projected positioning means for determining a vertical position of the accessory relative to the camera; and second indented positioning means located inside said first projected positioning means for determining a horizontal position of the accessory relative to the camera in a direction generally perpendicular to a mounting direction of the accessory on the camera, wherein said indented second positioning means is provided at a central position of said mounting member spaced from said first projected positioning means.

3. A mounting device of a camera as claimed in claim 1, wherein said second positioning means is provided at a central portion of said mounting member spaced from said first positioning means.

4. The mounting device of a camera as claimed in claim 2, wherein said mounting member is molded out of plastic in one piece.

5. The mounting device of a camera as claimed in claim 1, wherein said mounting member is molded out of plastic in one piece.

6. The mounting device of a camera as claimed in claim 3, wherein said mounting member is molded out of plastic in one piece.

7. A mounting device of an accessory for removably mounting the accessory on a camera, comprising an accessory mounting member which is slidable onto a mounting member of a camera so as to be set in position on the camera, wherein said accessory mounting member includes first indented positioning means which fit with corresponding projected positioning means of the camera so as to determine a vertical position of the accessory relative to the camera, and second projected positioning means which is provided inside said first indented positioning means and which fits with corresponding indented positioning means of the camera to determine a horizontal position of the accessory relative to the camera in a direction generally perpendicular to a mounting direction of the accessory on the camera, wherein said second projected positioning means is provided at a central portion of said accessory mounting member, spaced from said first indented positioning means.

8. The mounting device of an accessory as claimed in claim 7, wherein said accessory mounting member is molded out of plastic in one piece.

9. A mounting device for removably mounting an accessory on a camera which includes a mounting member fixed to a camera and a mounting member fixed to an accessory, both of said mounting members fitting with each other and said mounting member of the accessory being slidable onto said mounting member of the camera, wherein said mounting member of the camera includes first positioning means for determining a vertical position of the accessory relative to the camera and second positioning means located inside said first positioning means for determining a horizontal position of the accessory relative to the camera, and wherein said mounting member of the accessory includes first positioning means which fit with said first positioning means of the camera to determine the vertical position of the accessory and second positioning means which fit with said second positioning means of the camera to determine the horizontal position of the accessory, wherein said mounting member of the camera is fixed to the camera, and is provided with eaves-like portions which overhang from an upper portion thereof in opposite directions and which perpendicularly intersect a mounting direction of the accessory, thus having a generally T-shaped cross section, said second positioning means of the camera being located in a top face of said eaves-like portions.

10. A mounting device for removably mounting an accessory on a camera which includes a mounting member fixed to a camera and a mounting member fixed to an accessory, both of said mounting members fitting with each other and said mounting member of the accessory being slidable onto said mounting member of the camera, wherein said mounting member of the camera includes first projected positioning means for determining a vertical position of the accessory relative to the camera and second indented positioning means located inside said first projected positioning means for determining a horizontal position of the accessory relative to the camera in a direction generally perpendicular to a mounting direction of the camera on the accessory; and wherein said mounting member of the accessory includes first intended positioning means which fit with said first projected positioning means of the camera to determine the vertical position of the accessory and second projected positioning means which fit with said second indented positioning means of the camera to determine the horizontal position of the accessory in a direction generally perpendicular to a mounting direction of the camera on the accessory, wherein said second indented positioning means of the camera is provided at a central portion of said mounting member of the camera, spaced from said first projected positioning means of the camera.

11. The mounting device as claimed in claim 9, wherein said second positioning means of the camera is provided at a central portion of said mounting member of the camera, spaced from said first positioning means of the camera.

12. The mounting device as claimed in claim 9, wherein said second positioning means of the accessory is provided at a central portion of said mounting member of the accessory spaced from said first positioning means of the accessory.

13. The mounting device as claimed in claim 9, wherein said mounting member of the camera is molded out of plastic in one piece.

14. The mounting device as claimed in claim 10, wherein said mounting member of the camera is molded out of plastic in one piece.

15. The mounting device as claimed in claim 11, wherein said mounting member of the camera is molded out of plastic in one piece.

16. The mounting device as claimed in claim 12, wherein said mounting member of the camera is molded out of plastic in one piece.

17. The mounting device as claimed in claim 9, wherein said mounting member of the accessory is molded out of plastic in one piece.

18. The mounting device as claimed in claim 10, wherein said mounting member of the accessory is molded out of plastic in one piece.

19. A mounting device of a camera for removably mounting an accessory on the camera, comprising a mounting member which fits with an accessory which is slidable onto said mounting member, wherein said mounting member includes a positioning portion which extends in a direction for mounting the accessory and which determines a horizontal position of the accessory relative to the camera, and wherein the width of said positioning portion is narrower at a first end thereof which initially confronts the accessory during the mounting operation than at a second end thereof opposite said first end.

20. A mounting device of a camera for removably mounting an accessory on the camera, comprising a mounting member which fits with an accessory which is slidable onto said mounting member, wherein said mounting member includes a positioning portion which extends in a direction for mounting the accessory and which determines a vertical position of the accessory relative to the camera, and wherein the width of said positioning portion is narrower at a first end thereof which initially confronts the accessory during the mounting operation than at a second end thereof opposite said first end.

21. A mounting device of a camera for removably mounting an accessory on the camera, comprising a mounting member which fits with an accessory which is slidable onto said mounting member, wherein said mounting member includes first and second positioning portions which extend in a direction for mounting the accessory and which determine horizontal and vertical positions of the accessory relative to the camera, respectively, and wherein the width of said first positioning portion is narrower at a first end thereof which initially confronts the accessory during the mounting operation than at a second end thereof which is opposite said first end of said first positioning portion, and the width of said second positioning portion is also narrower at a first end thereof which initially confronts the accessory during the mounting operation than at a second end thereof which is opposite said first end of said second positioning portion.

22. A mounting device of an accessory for removably mounting the accessory on a camera, comprising an accessory mounting member which is slidable onto a mounting member of a camera so as to be set in position on the camera, wherein said mounting member of the accessory has a positioning portion which extends in a direction for mounting the accessory and which fits with a corresponding positioning portion of the camera to determine a horizontal position of the accessory relative to the camera, and wherein the width of said positioning portion of the accessory is narrower at its front end with respect to the mounting direction than at its back end.

23. A mounting device of an accessory for removably mounting the accessory on a camera, comprising an accessory mounting member which is slidable onto a mounting member of a camera so as to be set in position on the camera, wherein said mounting member of the accessory has a positioning portion which extends in a direction for mounting the accessory and which fits with a corresponding positioning portion of the camera to determine a vertical position of the accessory relative to the camera, and wherein the width of said positioning portion of the accessory is narrower at its front end with respect to the mounting direction than at its back end.

24. The mounting device of an accessory as claimed in claim 23, wherein said accessory mounting member includes a further positioning portion which extends in a direction for mounting the accessory and which fits with a corresponding further positioning portion of the camera to determine a horizontal position of the accessory relative to the camera, wherein the width of said further positioning portion of said accessory mounting member is narrower at its front end with respect to the mounting direction than at its back end.

25. A mounting device for removably mounting an accessory on a camera, comprising a mounting member fixed to an accessory, both of said mounting members fitting with each other and said mounting member of the accessory being slidable onto said mounting member of the camera, wherein said mounting member of the camera includes a positioning portion which extends in a direction for mounting the accessory and which determines a horizontal position of the accessory relative to the camera and wherein said mounting member of the accessory includes a positioning portion which extends in the mounting direction and fits with said positioning portion of the camera so as to determine the horizontal position of the accessory relative to the camera, the widths of said positioning portions of the camera and accessory being both narrower at first ends thereof which initially confront each other during the mounting operation than at second, opposite ends thereof.

26. A mounting device for removably mounting an accessory on a camera, comprising a mounting member fixed to the camera and a mounting member fixed to the accessory, both of said mounting members fitting with each other and said mounting member of the accessory being slidable onto said mounting member of the camera, wherein said mounting member of the camera includes a positioning portion which extends in a direction for mounting the accessory and determines a vertical position of the accessory relative to the camera, and said mounting member of the accessory includes a positioning portion which extends in the mounting direction and which fits with said positioning portion of the camera to determine the vertical position of the accessory relative to the camera, the widths of said positioning portions of the camera and accessory being narrower at first ends thereof which initially confront each other during the mounting operation than at second, opposite ends thereof.

27. The mounting device as claimed in claim 26, wherein said mounting member of the camera includes a further positioning portion which extends in a direction for mounting the accessory and determines a horizontal position of the accessory relative to the camera, and wherein said mounting member of the accessory includes a further positioning portion which extends in the mounting direction and which fits with said further positioning portion of the camera so as to determine the horizontal position of the accessory relative to the camera, said further positioning portions of the camera and accessory being narrower at first ends thereof which initially confront each other during the mounting operation than at second, opposite ends thereof.

28. A mounting device for removably mounting an accessory on a camera, comprising a mounting member fixed to a camera and a mounting member fixed to an accessory, both of said mounting members fitting with each other and said mounting member of the accessory being slidable onto said mounting member of the camera, wherein said mounting member of the camera is provided with a groove at a top central portion thereof running parallel to a direction for mounting the accessory, said groove for horizontally positioning the accessory, a plurality of electric contacts for performing signal transmission between the camera and accessory provided in the groove, and eaves-like portions which overhang from an upper portion of said mounting member of the camera in relative opposite directions which perpendicularly intersect a mounting direction of the accessory, said groove being located in a top face of said eaves-like portions.

29. The mounting device as claimed in claim 28, wherein said plurality of electric contacts are arrayed in two series in a staggered pattern so that said electric contacts are positioned in different phases.

30. The mounting device as claimed in claim 29, wherein a raised separation band is provided between said two series of said electric contacts.

31. The mounting device as claimed in claim 28, wherein said groove includes a lock recess for engaging with a lock member provided on said mounting member of the accessory.

32. The mounting device as claimed in claim 29, wherein said groove includes a lock recess for engaging with a lock member provided on said mounting member of the accessory.

33. The mounting device as claimed in claim 30, wherein said groove includes a lock recess for engaging with a lock member provided on said mounting member of the accessory.

34. The mounting device as claimed in claim 28, wherein said groove is narrow enough to prevent entrance therein of a user's fingers and thumb.

35. The mounting device as claimed in claim 29, wherein said groove is narrow enough to prevent entrance therein of a user's fingers and thumb.

36. The mounting device as claimed in claim 30, wherein said groove is narrow enough to prevent entrance therein of a user's fingers and thumb.

37. The mounting device as claimed in claim 31, wherein said groove is narrow enough to prevent entrance therein of a user's fingers and thumb.

38. The mounting device as claimed in claim 32, wherein said groove is narrow enough to prevent entrance therein of a user's fingers and thumb.

39. The mounting device as claimed in claim 33, wherein said groove is narrow enough to prevent entrance therein of a user's fingers and thumb.

40. A mounting device of a camera for removably mounting an accessory on the camera, comprising a mounting member which fits with an accessory which is slidable onto said mounting member, wherein said mounting member includes at least one eaves-like surface which overhangs from said mounting member to define, together with an external surface of the camera, at least one groove for determining a vertical position of the accessory relative to the camera, at least one electric terminal for forming an electrical connection between the camera and accessory being provided on a surface of said groove underneath said eaves-like portion.

41. The mounting device of a camera as claimed in claim 40, wherein said electric terminal is capable of supplying electric power from the camera to the accessory.

42. The mounting device of a camera as claimed in claim 40, wherein said mounting member is molded out of plastic in one piece, and said at least one electrical terminal includes at least two electric terminals provided on opposite sides of said mounting member.

43. The mounting device of a camera as claimed in claim 41, wherein said mounting member is molded out of plastic in one piece, and said at least one electrical terminal includes at least two electric terminals provided on opposite sides of said mounting member.

44. A mounting device of an accessory for removably mounting the accessory on a camera, comprising an accessory mounting member which is slidable onto a mounting member of a camera so as to be set in position on the camera, wherein said mounting member of the accessory includes at least one projection which fits with at least one corresponding groove of the camera which is formed by an external surface of the camera and an eaves-like surface which overhangs from said mounting member of the camera to determine a vertical position of the accessory relative to the camera, and at least one electric terminal for forming an electrical connection between the camera and the accessory provided on a surface of said projection which extends underneath said eaves-like surface when said mounting member of the accessory is slid onto said mounting member of the camera.

45. The mounting device of an accessory as claimed in claim 44, wherein said at least one electric terminal is capable of supplying electric power from the camera to the accessory.

46. A mounting device for removably mounting an accessory on a camera, comprising a mounting member fixed to a camera and a mounting member fixed to an accessory, both of said mounting members fitting with each other and said mounting member of the accessory being slidable onto said mounting member of the camera, wherein said mounting member of the camera includes at least one eaves-like surface which overhangs from said mounting member of the camera to define, together with an external surface of the camera, at least one groove for determining a vertical position of the accessory relative to the camera, at least one electric terminal for forming an electrical connection between the camera and accessory being provided on a surface of said groove underneath said eaves-like portion, said mounting member of the accessory including at least one projection which fits with said groove of the camera to determine the vertical position of the accessory relative to the camera, and at least one electric terminal to be connected to said electric terminal of the camera which is provided on a surface of said projection which extends underneath said eaves-like surface when said mounting member of the accessory is slid onto said mounting member of the camera.

47. The mounting device as claimed in claim 46, wherein said electric terminals of the camera and the accessory are capable of supplying electric power from the camera to the accessory.

48. The mounting device as claimed in claim 46, wherein said mounting member of the camera is molded out of plastic in one piece, and said at least one electrical terminal of the camera includes at least two electric terminals of the camera provided on opposite sides of said mounting member of the camera.

49. The mounting device as claimed in claim 47, wherein said mounting member of the camera is molded out of plastic in one piece, and said at least one electrical terminal of the camera includes at least two electric terminals provided on opposite sides of said mounting member of the camera.

50. A mounting device of a camera for removably mounting an accessory on the camera, comprising a mounting member of the camera which fits with an accessory which is slidable onto said mounting member, wherein said mounting member includes positioning means for determining a horizontal position of the accessory relative to the camera, and guide means, provided at the front of said positioning means with respect to a direction of mounting the accessory, said guide means for holding the accessory more loosely during an initial stage of the mounting operation than during a final stage of the mounting operation.

51. A mounting device of a camera for removably mounting an accessory on the camera, comprising a mounting member of the camera which fits with an accessory which is slidable onto said mounting member, wherein said mounting member includes positioning means for determining a vertical position of the accessory relative to the camera, and guide means, provided at the front of said positioning means with respect to a direction of mounting the accessory, said guide means for holding the accessory more loosely during an initial stage of the mounting operation than during a final stage of the mounting operation.

52. A mounting device of an accessory for removably mounting the accessory on a camera, comprising a mounting member of the accessory which is slidable onto a mounting member of the camera so as to be set in position on the camera, wherein said mounting member of the accessory includes positioning means which fit with corresponding positioning means of the camera so as to determine a horizontal position of the accessory relative to the camera, and guide means, provided at the front of said positioning means of the accessory with respect to a direction of mounting the accessory, said guide means for being held more loosely by said mounting member of the camera during an initial stage of the mounting operation than during a final stage of the mounting operation.

53. A mounting device of an accessory for removably mounting the accessory on a camera, comprising a mounting member of the accessory which is slidable onto a mounting member of the camera so as to be set in position on the camera, wherein said mounting member of the accessory includes positioning means which fit with corresponding positioning means of the camera so as to determine a vertical position of the accessory relative to the camera, and guide means, provided at the front of said positioning means of the accessory with respect to a direction of mounting the accessory, said guide means for being held more loosely by said mounting member of the camera during an initial stage of the mounting operation than during a final stage of the mounting operation.

54. A mounting device for removably mounting an accessory on a camera, comprising a mounting member fixed to a camera and a mounting member fixed to an accessory, both of said mounting members fitting with each other and said mounting member of the accessory being slidable onto said mounting member of the camera, wherein said mounting member of the camera includes positioning means for determining a horizontal position of the accessory relative to the camera, and guide means, provided at the front of said positioning means with respect to a direction of mounting the accessory, and wherein said mounting member of the accessory includes accessory positioning means which fit with the positioning means of the camera so as to determine the horizontal position of the accessory, and accessory guide means, provided at the front of said positioning means of the accessory with respect to the mounting direction and which cooperate with said guide means of the camera, said guide means of the camera for holding said guide means of the accessory more loosely during an initial stage of the mounting operation than during a final stage of the mounting operation.

55. A mounting device for removably mounting an accessory on a camera, comprising a mounting member fixed to a camera and a mounting member fixed to an accessory, both of said mounting members fitting with each other and said mounting member of the accessory being slidable onto said mounting member of the camera, wherein said mounting member of the camera includes positioning means for determining a vertical position of the accessory relative to the camera, and guide means, provided at the front of said positioning means with respect to a direction for mounting the accessory, and wherein said mounting member of the accessory includes accessory positioning means which fit with said positioning means of the camera to determine the vertical position of the accessory, and accessory guide means, provided at the front of said positioning means of the accessory with respect to the mounting direction, for cooperating with said guide means of the camera, said guide means of the camera for holding said guide means of the accessory more loosely during an initial stage of the mounting operation than during a final stage of the mounting operation.

56. a mounting device of a camera for removably mounting an accessory on the camera, comprising a mounting member which fits with an accessory which is slidable onto said mounting member, wherein said mounting member is provided with a groove at a top central portion thereof running parallel to a direction for mounting the accessory, said groove including an insertion opening at a second end thereof which is opposite a first end thereof which initially confronts the accessory during the mounting operation, and wherein said mounting member is also provided on opposite sides thereof with one or more concave portions for determining a vertical position of the accessory relative to the camera, a plurality of electric terminals including a first electric terminal being provided in said groove for performing a reciprocal signal transmission between the camera and accessory, wherein said first electric terminal supplies electric power from the camera to the accessory, and is located at a position farthest from said insertion opening in said groove so as to be connected to a corresponding terminal of the accessory at a final stage of a mounting, one or more second electric terminals for supplying a large electric current from the camera to the accessory being provided on a surface defining a lower surface or a side surface of at least one of said concave portions.

57. A mounting device for removably mounting an accessory on a camera, comprising a mounting member fixed to a camera and a mounting member fixed to an accessory, both of said mounting members fitting with each other and said mounting member of the accessory being slidable onto said mounting member of the camera, wherein said mounting member of the camera is provided with a groove at a top central portion thereof running parallel to a direction for mounting the accessory, said groove including an insertion opening at a second end thereof which is opposite a first end thereof which initially confronts the accessory during the mounting operation, and wherein said mounting member of the camera is also provided with a concave portion for determining a vertical position of the accessory relative to the camera, a plurality of electric terminals including a first electric terminal being provided in said groove for performing signal transmission between the camera and the accessory, wherein said first electric terminal supplies electric power from the camera to the accessory, and is located at a position farthest from said insertion opening in said groove so as to be connected to a corresponding terminal of the accessory at a final stage of a mounting process, said mounting member of the accessory being provided with a convex portion which fits with said concave portion of said mounting member of the camera and determines the vertical position of the accessory, second terminals for supplying a large current from the camera to the accessory being provided on each of surfaces defining lower surfaces of the concave and convex portions or on each of surfaces defining side surfaces of the concave and convex portions.

58. A mounting device for removably mounting an accessory on a camera, comprising a mounting member fixed to a camera and a mounting member fixed to an accessory, both of said mounting members fitting with each other and said mounting member of the accessory being slidable onto said mounting member of the camera, wherein said mounting member of the camera is provided with a groove at a top central portion thereof running parallel to a direction for mounting the accessory, said groove for horizontally positioning the accessory, a plurality of electric contacts for performing signal transmission between the camera and accessory provided in the groove, wherein said plurality of electric contacts are arrayed in two series in a staggered pattern, and wherein a raised separation band is provided between said two series of said electric contacts.

* * * * *